US010788654B2

(12) United States Patent
Amano

(10) Patent No.: US 10,788,654 B2
(45) Date of Patent: Sep. 29, 2020

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 143 days.

(21) Appl. No.: 16/198,095

(22) Filed: Nov. 21, 2018

(65) Prior Publication Data

US 2019/0155004 A1 May 23, 2019

(30) Foreign Application Priority Data

Nov. 22, 2017 (JP) ................. 2017-225103

(51) Int. Cl.
*G02B 15/14* (2006.01)
*G02B 15/16* (2006.01)
*G02B 13/02* (2006.01)
*G02B 13/18* (2006.01)

(52) U.S. Cl.
CPC ............. *G02B 15/16* (2013.01); *G02B 13/02* (2013.01); *G02B 13/18* (2013.01)

(58) Field of Classification Search
CPC ........ G02B 15/16; G02B 15/17; G02B 15/20; G02B 15/163; G02B 15/167; G02B 15/173; G02B 15/177; G02B 13/0064; G02B 13/02; G02B 13/04; G02B 13/06; G02B 13/16; G02B 13/18; G02B 13/22; G02B 17/008; G02B 17/0657; G02B 17/0896; G02B 9/64; G03B 21/14; G03B 21/142; G03F 7/70275; G03F 7/70233
USPC ....... 359/432, 434, 557, 649, 676–689, 713; 353/98; 348/345, 676
See application file for complete search history.

(56) References Cited

U.S. PATENT DOCUMENTS

| 2014/0078595 A1* | 3/2014 | Amano ................ G02B 15/173 359/682 |
| 2014/0111868 A1* | 4/2014 | Nagatoshi ............ G02B 15/177 359/680 |
| 2015/0268453 A1 | 9/2015 | Oe et al. |
| 2016/0266360 A1* | 9/2016 | Yamasaki .............. G02B 13/04 |
| 2017/0153427 A1 | 6/2017 | Masui |

FOREIGN PATENT DOCUMENTS

| JP | 2015-179270 A | 10/2015 |
| JP | 2017-102239 A | 6/2017 |

* cited by examiner

*Primary Examiner* — Mustak Choudhury
(74) *Attorney, Agent, or Firm* — Studebaker & Brackett PC

(57) ABSTRACT

An imaging optical system consists of, in order from a magnification side: a first imaging optical system that forms an intermediate image on a position conjugate to a magnification side imaging surface; and a second imaging optical system that re-forms the intermediate image on a reduction side imaging surface. The second imaging optical system consists of a plurality of lens groups including at least two movable lens groups which move during zooming. The imaging optical system satisfies predetermined conditional expressions.

18 Claims, 18 Drawing Sheets

EXAMPLE 1

EXAMPLE 4

IMAGING OPTICAL SYSTEM, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2017-225103 filed on Nov. 22, 2017. The above application is hereby expressly incorporated by reference, in its entirety, into the present application.

BACKGROUND OF THE INVENTION

1. Field of the Invention

The present invention relates to an imaging optical system forming an intermediate image, a projection display device comprising the imaging optical system, and an imaging apparatus comprising the imaging optical system.

2. Description of the Related Art

In the past, projection display devices, each of which uses a light valve such as a liquid crystal display element or a Digital Micromirror Device (DMD: registered trademark) display element, have come into widespread use.

Favorable optical aberration correction appropriate for the resolution of the light valve is required for the imaging optical system used in this type of the projection display devices. In addition, there has been an increase in the demand to mount an imaging optical system on a projection display device. The imaging optical system has a high optical performance in which various aberrations are satisfactorily corrected while having a wide angle and a high magnification, in consideration of an increase in degree of freedom in setting the distance to a screen.

An imaging optical system, which forms an intermediate image at a position conjugate to the reduction side imaging surface and re-forms the intermediate image on the magnification side imaging surface, has been proposed so as to cope with such demands (for example, JP2017-102239A and JP2015-179270A)

SUMMARY OF THE INVENTION

However, the lens of JP2017-102239A has a problem in that the lens has a zoom ratio of about 1.3 times and an angle of view of about 100°, and does not deal with the recent demands. In addition, the lens of JP2015-179270A has a problem in that the lens has a high magnification since the zoom ratio is about 1.9 times but has an insufficient wide angle since the angle of view is about 120° and has large fluctuation in aberrations caused by zooming.

The present invention has been made in consideration of the above-mentioned situations, and it is an object of the present invention to provide an imaging optical system forming an intermediate image, a projection display device comprising the imaging optical system, and an imaging apparatus comprising the imaging optical system. The imaging optical system has a high optical performance in which various aberrations are satisfactorily corrected while having a wide angle and a high magnification.

An imaging optical system of the present invention consists of, in order from a magnification side: a first imaging optical system that forms an intermediate image on a position conjugate to a magnification side imaging surface; and a second imaging optical system that re-forms the intermediate image on a reduction side imaging surface. In a case where a group from which an adjacent group is separated by a distance variable in a direction of an optical axis during zooming is set as one lens group, the second imaging optical system consists of a plurality of lens groups including at least two movable lens groups which move during zooming. Assuming that a focal length of the first imaging optical system at a wide-angle end is f1w, a focal length of the whole system at the wide-angle end is fw, a focal length of the first imaging optical system at a telephoto end is f1t, a focal length of the whole system at the telephoto end is ft, and an effective image circle radius on a reduction side is Ymax, Conditional Expression (1) is satisfied.

$$1.15 < (f1w/|fw| - f1t/|ft|) \times Ymax/|fw| < 5 \quad (1)$$

It is more preferable to satisfy Conditional Expression (1-1).

$$1.2 < (f1w/|fw| - f1t/|ft|) \times Ymax/|fw| < 3.5 \quad (1-1)$$

It is preferable that the imaging optical system of the present invention consists of six or seven lens groups as a whole. It is preferable that, in the whole system, a lens group closest to the magnification side and a lens group closest to the reduction side are lens groups that have positive refractive powers and remain stationary with respect to the reduction side imaging surface during zooming.

Further, it is preferable that in a case where the movable lens groups disposed on the magnification side with a maximum air distance at the wide-angle end are collectively set as a magnification side moving group and the movable lens groups disposed on the reduction side are collectively set as a reduction side moving group in the second imaging optical system, during zooming from the wide-angle end to the telephoto end, the movable lens groups in the magnification side moving group move toward the reduction side, and the movable lens groups in the reduction side moving group move to the magnification side.

Further, assuming that a lateral magnification of the reduction side moving group at the telephoto end is βBt and a lateral magnification of the reduction side moving group at the wide-angle end is βBw, it is preferable to satisfy the Conditional Expression (2), and it is more preferable to satisfy the Conditional Expression (2-1).

$$1.3 < \beta Bt/\beta Bw < 3 \quad (2)$$

$$1.35 < \beta Bt/\beta Bw < 2.5 \quad (2-1)$$

Further, assuming that a lateral magnification of the magnification side moving group at the telephoto end is βAt and a lateral magnification of the magnification side moving group at the wide-angle end is βAw, it is preferable to satisfy the Conditional Expression (3), and it is more preferable to satisfy the Conditional Expression (3-1).

$$0.8 < \beta At/\beta Aw < 1.2 \quad (3)$$

$$0.85 < \beta At/\beta Aw < 1.15 \quad (3-1)$$

Further, it is preferable that the reduction side moving group has the at least two movable lens groups. In addition, assuming that a focal length of the movable lens group closest to the reduction side in the reduction side moving group is fBL and a focal length of the whole system at the wide-angle end is fw, it is preferable to satisfy the Conditional Expression (4), and it is more preferable to satisfy the Conditional Expression (4-1).

$$8<fBL/|fw|<40 \tag{4}$$

$$10.5<fBL/|fw|<35 \tag{4-1}$$

Further, assuming that a back focal length of the whole system at the wide-angle end is Bfw and a focal length of the whole system at the wide-angle end is fw, it is preferable to satisfy the Conditional Expression (5), and it is more preferable to satisfy the Conditional Expression (5-1).

$$7<Bfw/|fw| \tag{5}$$

$$9<Bfw/|fw|<20 \tag{5-1}$$

Further, it is preferable that a lens group closest to the reduction side in the whole system consists of one single lens.

Further, the second imaging optical system may consist of, in order from the magnification side, a second A lens group having a positive refractive power, a second B lens group having a positive refractive power, a second C lens group having a positive refractive power, a second D lens group having a negative refractive power, a second E lens group having a positive refractive power, and a second F lens group having a positive refractive power. In addition, during zooming, the second B lens group, the second C lens group, the second D lens group, and the second E lens group may move, and the second F lens group may remain stationary with respect to the reduction side imaging surface.

Further, the second imaging optical system may consist of, in order from the magnification side, a second A lens group having a positive refractive power, a second B lens group having a positive refractive power, a second C lens group having a negative refractive power, a second D lens group having a positive refractive power, and a second E lens group having a positive refractive power. In addition, during zooming, the second A lens group, the second B lens group, the second C lens group, and the second D lens group may move, and the second E lens group may remain stationary with respect to the reduction side imaging surface.

Further, the second imaging optical system may consist of, in order from the magnification side, a second A lens group having a positive refractive power, a second B lens group having a positive refractive power, a second C lens group having a positive refractive power, and a second D lens group having a positive refractive power. In addition, during zooming, the second A lens group, the second B lens group, and the second C lens group may move, and the second D lens group may remain stationary with respect to the reduction side imaging surface.

A projection display device, comprising: a light valve from which an optical image is output based on image data; and the imaging optical system according to claim 1, wherein the imaging optical system projects the optical image, which is output from the light valve, onto a screen.

An imaging apparatus of the present invention comprises the above-mentioned imaging optical system of the present invention.

It should be noted that the term "consists of ~" means that the imaging optical system may include not only the above-mentioned elements but also lenses substantially having no powers, optical elements, which are not lenses, such as a stop, a mask, a cover glass, a filter, a mirror, and a prism, and mechanism parts such as a lens flange, a lens barrel, an imaging element, and a camera shaking correction mechanism.

Further, the term "lens group" means that it may include not only a lens, but also optical elements other than a lens such as a stop, a mask, a cover glass, a filter, a mirror, and a prism.

Further, among the symbols of the respective conditional expressions, the focal length and the lateral magnification mean a focal length and a lateral magnification in a case where the distance from the magnification side imaging surface to the first imaging optical system is infinite.

The imaging optical system of the present invention consists of, in order from a magnification side: a first imaging optical system that forms an intermediate image on a position conjugate to a magnification side imaging surface; and a second imaging optical system that re-forms the intermediate image on a reduction side imaging surface. In a case where a group from which an adjacent group is separated by a distance variable in a direction of an optical axis during zooming is set as one lens group, the second imaging optical system consists of a plurality of lens groups including at least two movable lens groups which move during zooming. Assuming that a focal length of the first imaging optical system at a wide-angle end is f1w, a focal length of the whole system at the wide-angle end is fw, a focal length of the first imaging optical system at a telephoto end is f1t, a focal length of the whole system at the telephoto end is ft, and an effective image circle radius on a reduction side is Ymax, Conditional Expression (1) is satisfied. Therefore, it is possible to provide an imaging optical system having a high optical performance in which various aberrations are satisfactorily corrected while having a wide angle and a high magnification, a projection display device comprising the imaging optical system, and an imaging apparatus comprising the imaging optical system.

$$1.15<(f1w/|fw|-f1t/|ft|)\times Y\max/|fw|<5 \tag{1}$$

DESCRIPTION OF THE PREFERRED EMBODIMENTS

Figure 1:
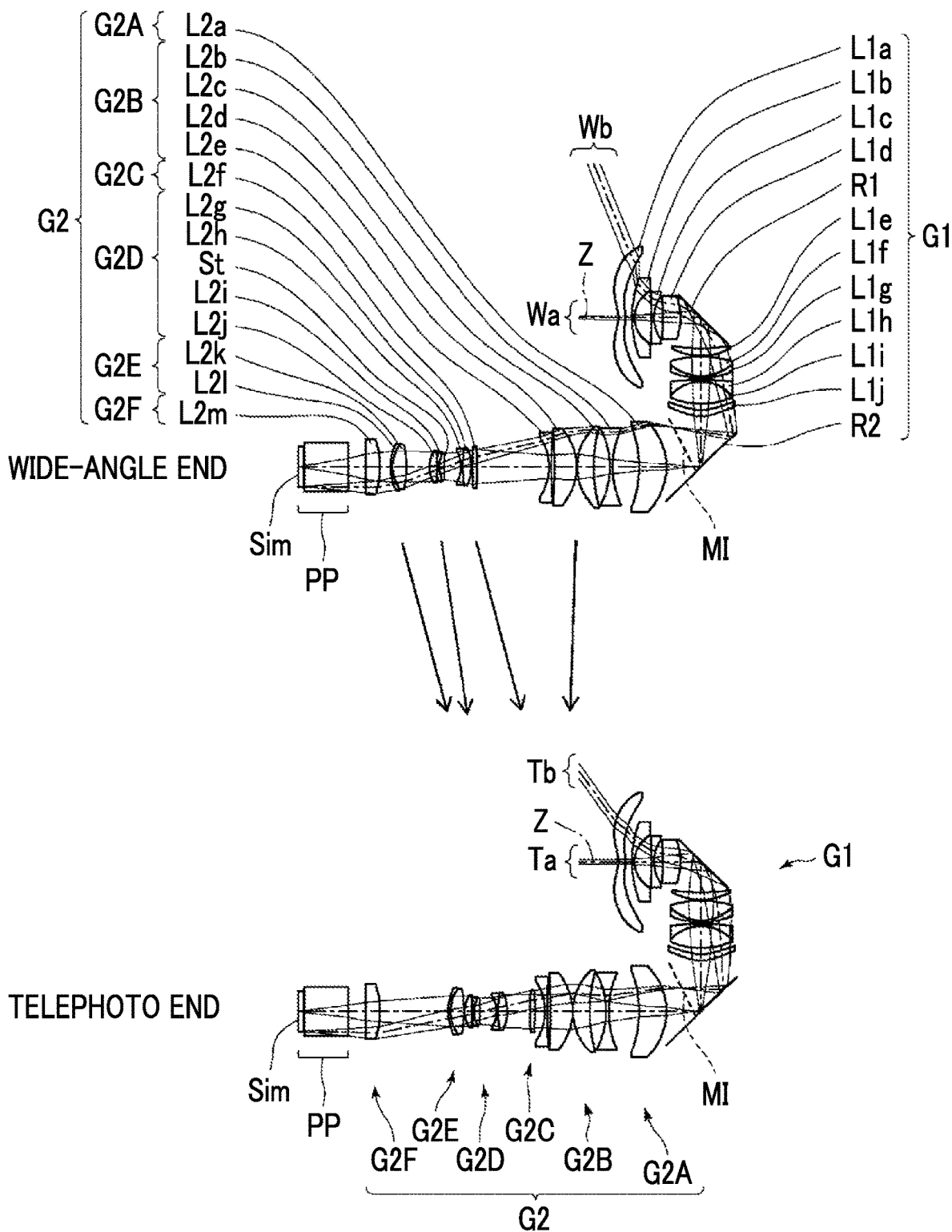
FIG. 1 is a cross-sectional view illustrating a lens configuration of an imaging optical system (common to Example 1) according to an embodiment of the present invention.

Hereinafter, an embodiment of the present invention will be described in detail with reference to the drawing. FIG. 1 is a cross-sectional view illustrating a lens configuration of an imaging optical system according to an embodiment of the present invention. The exemplary configuration shown in FIG. 1 is the same as the configuration of the imaging optical system of Example 1 to be described later. In FIG. 1, in a case where the optical path is expanded, it is assumed that the left side is the magnification side and the right side is the reduction side. Further, FIG. 1 shows a state where a distance from the magnification side imaging surface to the first imaging optical system is infinite. The upper part of the drawing shows a wide-angle end state, where on-axis rays Wa and rays with the maximum angle of view Wb as the rays are denoted. The lower part of the drawing shows a telephoto end state, where on-axis rays Ta and rays with the maximum angle of view Tb as the rays are denoted.

This imaging optical system is, for example, mounted on a projection display device, and can be used to project image information displayed on the light valve onto the screen. In FIG. 1, assuming that the imaging optical system is mounted on a projection display device, an optical member PP such as a filter or a prism used in a color synthesizing section or an illumination light separating section, and an image display surface Sim of a light valve are also shown. In the projection display device, rays, which are made to have image information through the image display surface Sim on the image display element, are incident into the imaging optical system through the optical member PP, and are projected onto a screen, which is not shown in the drawing, through the imaging optical system.

As shown in FIG. 1, the imaging optical system of the present embodiment is composed of, in order from the magnification side, a first imaging optical system G1 that forms an intermediate image MI at a position conjugate to a magnification side imaging surface, and a second imaging optical system G2 that re-forms the intermediate image MI on a reduction side imaging surface (image display surface Sim). In FIG. 1, the intermediate image MI is schematically shown, and does not show an actual shape.

As described above, in the imaging optical system configured to form the intermediate image MI, it is possible to reduce a back focal length of the first imaging optical system G1, and it is possible to reduce a lens diameter of the first imaging optical system G1 on the magnification side. As a result, the system can be configured to be appropriate for achieving a wide angle by reducing the focal length of the whole system.

Further, in a case where a group from which an adjacent group is separated by a distance variable in a direction of an optical axis Z during zooming is set as one lens group, the second imaging optical system G2 is composed of a plurality of lens groups including at least two movable lens groups which move during zooming. As described above, regarding the zooming effect of the imaging optical system, the second imaging optical system G2 is made to have a main function for the zooming effect. With such a configuration, the main zooming is performed by changing the relay magnification of the second imaging optical system G2, that is, by changing the size of the intermediate image MI. Thus, the optical configuration of the imaging optical system can be simplified.

Further, assuming that a focal length of the first imaging optical system G1 at a wide-angle end is f1w, a focal length of the whole system at the wide-angle end is fw, a focal length of the first imaging optical system G1 at a telephoto end is f1t, a focal length of the whole system at the telephoto end is ft, and an effective image circle radius on a reduction side is Ymax, Conditional Expression (1) is satisfied.

$$1.15 < (|f1w|/|fw| - |f1t|/|ft|) \times Ymax/|fw| < 5 \quad (1)$$

Conditional Expression (1) is a conditional expression for achieving both a wide angle and a high magnification. In order to achieve both a wide angle and a high magnification, it is necessary to appropriately set the relay magnification at the wide-angle end and the telephoto end of the second imaging optical system G2. By not allowing the result of Conditional Expression (1) to be equal to or less than the lower limit, the difference between the relay magnification at the wide-angle end and the relay magnification at the telephoto end can be prevented from becoming excessively small. As a result, there is an advantage in ensuring a desired zoom ratio. By not allowing the result of Conditional Expression (1) to be equal to or greater than the upper limit, it is possible to prevent the difference in the relay magnification from becoming excessively large. Therefore, there is an advantage in achieving reduction in magnification side lens diameter of the first imaging optical system G1 and correcting distortion and field curvature at the wide-angle end while ensuring a desired angle of view and a zoom ratio. In addition, in a case where Conditional Expression (1-1) is satisfied, it is possible to obtain more favorable characteristics.

$$1.2 < (|f1w|/|fw| - |f1t|/|ft|) \times Ymax/|fw| < 3.5 \quad (1-1)$$

It is preferable that the imaging optical system of the present embodiment consists of six or seven lens groups as a whole. It is preferable that, in the whole system, a lens group closest to the magnification side and a lens group closest to the reduction side are lens groups that have positive refractive powers and remain stationary with respect to the reduction side imaging surface during zooming. In such a manner, by making the lens group closest to the magnification side stationary during zooming, it is possible to make the lens configuration free from fluctuation in total length of the lens. In addition, by making the lens group closest to the reduction side stationary, it is possible to reduce fluctuation in aberrations during zooming while maintaining telecentricity.

Further, it is preferable that in a case where the movable lens groups disposed on the magnification side with a maximum air distance at the wide-angle end are collectively set as a magnification side moving group and the movable lens groups disposed on the reduction side are collectively set as a reduction side moving group in the second imaging optical system G2, during zooming from the wide-angle end to the telephoto end, the movable lens groups in the magnification side moving group move toward the reduction side, and the movable lens groups in the reduction side moving group move to the magnification side.

In addition, in the example shown in FIG. 1, the second imaging optical system G2 is composed of a second A lens group G2A, a second B lens group G2B, a second C lens group G2C, a second D lens group G2D, a second E lens group G2E, and a second F lens group G2F. In the system, the second B lens group G2B corresponds to the magnification side moving group, and the second C lens group G2C, the second D lens group G2D, and the second E lens group G2E correspond to the reduction side moving group.

The reduction side moving group is a group that has a main function of zooming, and the magnification side moving group is a group that is to mostly correct fluctuation in image plane position caused by zooming. During zooming from the wide-angle end to the telephoto end, the movable lens group in the moving group moves to the reduction side, and the movable lens group in the reduction side moving group moves to the magnification side. Thereby, it is possible to satisfactorily correct fluctuation in spherical aberration and astigmatism during zooming.

Further, assuming that a lateral magnification of the reduction side moving group at the telephoto end is βBt and a lateral magnification of the reduction side moving group at the wide-angle end is βBw, it is preferable to satisfy the Conditional Expression (2). By not allowing the result of Conditional Expression (2) to be equal to or less than the lower limit, the zooming effect of the reduction side moving group can be prevented from becoming excessively small. As a result, there is an advantage in ensuring the zoom ratio. By not allowing the result of Conditional Expression (2) to be equal to or greater than the upper limit, the zooming effect of the reduction side moving group can be prevented from becoming excessively large. As a result, there is an advantage in suppressing fluctuation in aberrations during zooming. In addition, in a case where Conditional Expression (2-1) is satisfied, it is possible to obtain more favorable characteristics.

$$1.3 < \beta Bt/\beta Bw < 3 \tag{2}$$

$$1.35 < \beta Bt/\beta Bw < 2.5 \tag{2-1}$$

Further, assuming that a lateral magnification of the magnification side moving group at the telephoto end is βAt and a lateral magnification of the magnification side moving group at the wide-angle end is βAw, it is preferable to satisfy the Conditional Expression (3). By not allowing the result of Conditional Expression (3) to be equal to or less than the lower limit, the zooming effect of the magnification side moving group can be prevented from becoming excessively small. Thus, the amount of movement of the reduction side moving group contributing to zooming is minimized. As a result, there is an advantage in achieving reduction in size of the entire lens system. By not allowing the result of Conditional Expression (3) to be equal to or greater than the upper limit, the zooming effect of the magnification side moving group can be prevented from becoming excessively large. As a result, there is an advantage suppressing fluctuation in aberrations during zooming. In addition, there is also an advantage in correcting fluctuation in image plane position caused by zooming. In addition, in a case where Conditional Expression (3-1) is satisfied, it is possible to obtain more favorable characteristics.

$$0.8 < \beta At/\beta Aw < 1.2 \tag{3}$$

$$0.85 < \beta At/\beta Aw < 1.15 \tag{3-1}$$

Further, it is preferable that the reduction side moving group has the at least two movable lens groups. In addition, assuming that a focal length of the movable lens group closest to the reduction side in the reduction side moving group is fBL and a focal length of the whole system at the wide-angle end is fw, it is preferable to satisfy the Conditional Expression (4). In such a manner, by providing two or more movable lens groups in the reduction side moving group that has the function for the zooming effect, there is an advantage in correcting fluctuation in aberrations caused by an increase in magnification. By not allowing the result of Conditional Expression (4) to be equal to or less than the lower limit, the zooming effect can be prevented from becoming excessively strong. Thus, it is possible to reduce fluctuation in longitudinal chromatic aberration and spherical aberration during zooming. By not allowing the result of Conditional Expression (4) to be equal to or greater than the upper limit, the zooming effect can be prevented from becoming excessively weak. Thus, the amount of movement for ensuring a desired zoom ratio is minimized. As a result, there is an advantage in achieving reduction in total length of the lens. In addition, in a case where Conditional Expression (4-1) is satisfied, it is possible to obtain more favorable characteristics.

$$8 < fBL/|fw| < 40 \tag{4}$$

$$10.5 < fBL/|fw| < 35 \tag{4-1}$$

Further, assuming that a back focal length of the whole system at the wide-angle end is Bfw and a focal length of the whole system at the wide-angle end is fw, it is preferable to satisfy the Conditional Expression (5). By not allowing the result of the conditional expression (5) to be equal to or less than the lower limit, the back focal length can be prevented from being excessively shortened. Thus, there is an advantage in arranging the color synthesizing prism and the like. In addition, in a case where Conditional Expression (5-1) is satisfied, it is possible to obtain more favorable characteristics. By not allowing the result of Conditional Expression (5-1) to be equal to or greater than the upper limit, there is an advantage in suppressing an increase in size of the entire lens system including the back focal length.

$$7 < Bfw/|fw| \tag{5}$$

$$9 < Bfw/|fw| < 20 \tag{5-1}$$

Further, it is preferable that a lens group closest to the reduction side in the whole system consists of one single lens. By adopting such a configuration, the system is composed of the minimum number of lenses required for the lens configuration. As a result, there is an advantage in achieving reduction in costs.

Further, the second imaging optical system G2 may consist of, in order from the magnification side, a second A lens group G2A having a positive refractive power, a second B lens group G2B having a positive refractive power, a second C lens group G2C having a positive refractive power, a second D lens group G2D having a negative refractive power, a second E lens group G2E having a positive refractive power, and a second F lens group G2F having a positive refractive power. In addition, during zooming, the second B lens group G2B, the second C lens group G2C, the second D lens group G2D, and the second E lens group G2E move, and the second F lens group G2F may remain stationary with respect to the reduction side imaging surface.

The configurations of Examples 1 to 3 to be described later correspond to this configuration. The second A lens group G2A and/or the second B lens group G2B correspond to the magnification side moving group, and mainly contribute to the correction of the image plane position. The second C lens group G2C, the second D lens group G2D, and the second E lens group G2E correspond to the reduction side moving group, or the second B lens group G2B, the second C lens group G2C, the second D lens group G2D, and the second E lens group G2E correspond to the reduction side moving group, and mainly have the function for the zooming effect. By making the second F lens group G2F stationary during zooming, it is possible to reduce fluctuation in aberrations during zooming while maintaining telecentricity. With such a configuration of the second imaging optical system G2, it is possible to provide an imaging optical system having a high optical performance in which various aberrations are satisfactorily corrected while maintaining a wide angle and a high magnification.

Further, the second imaging optical system G2 may consist of, in order from the magnification side, a second A lens group G2A having a positive refractive power, a second B lens group G2B having a positive refractive power, a second C lens group G2C having a negative refractive power, a second D lens group G2D having a positive refractive power, and a second E lens group G2E having a positive refractive power. In addition, during zooming, the second A lens group G2A, the second B lens group G2B, the second C lens group G2C, and the second D lens group G2D may move, and the second E lens group G2E may remain stationary with respect to the reduction side imaging surface.

The configurations of Examples 4 to 6 to be described later correspond to this configuration. The second A lens group G2A corresponds to the magnification side moving group, and mainly contributes to the correction of the image plane position. The second B lens group G2B, the second C lens group G2C, and the second D lens group G2D correspond to the reduction side moving group, and mainly have the function for the zooming effect. By making the second E lens group G2E stationary during zooming, it is possible to reduce fluctuation in aberrations during zooming while maintaining telecentricity. With such a configuration of the second imaging optical system G2, it is possible to provide an imaging optical system having a high optical performance in which various aberrations are satisfactorily corrected while maintaining a wide angle and a high magnification.

Further, the second imaging optical system G2 may consist of, in order from the magnification side, a second A lens group G2A having a positive refractive power, a second B lens group G2B having a positive refractive power, a second C lens group G2C having a positive refractive power, and a second D lens group G2D having a positive refractive power. In addition, during zooming, the second A lens group G2A, the second B lens group G2B, and the second C lens group G2C may move, and the second D lens group G2D may remain stationary with respect to the reduction side imaging surface.

The configuration of Example 7 to be described later corresponds to this configuration. The second A lens group G2A corresponds to the magnification side moving group, and mainly contributes to the correction of the image plane position. The second B lens group G2B, and the second C lens group G2C correspond to the reduction side moving group, and mainly have the function for the zooming effect. By making the second D lens group G2D stationary during zooming, it is possible to reduce fluctuation in aberrations during zooming while maintaining telecentricity. With such a configuration of the second imaging optical system G2, it is possible to provide an imaging optical system having a high optical performance in which various aberrations are satisfactorily corrected while maintaining a wide angle and a high magnification.

In the example shown in FIG. 1, the optical member PP is disposed between the lens system and the image display surface Sim. However, various filters such as a lowpass filter and a filter for cutting off a specific wavelength range may not be disposed between the lens system and the image display surface Sim. Instead, such various filters may be disposed between the lenses, or coating for functions the same as those of various filters may be performed on a lens surface of any lens.

Next, numerical examples of the imaging optical system according to the embodiment of the present invention will be described. First, an imaging optical system of Example 1 will be described. FIG. 1 is a cross-sectional view illustrating a lens configuration of the imaging optical system of Example 1. In FIG. 1 and FIGS. 2 to 7 corresponding to Examples 2 to 7 to be described later, the left side is the magnification side, and the right side is the reduction side. Further, FIGS. 1 to 7 each show a state where a distance from the magnification side imaging surface to the first imaging optical system is infinite. The upper part of the drawing shows a wide-angle end state, where on-axis rays Wa and rays with the maximum angle of view Wb as the rays are denoted. The lower part of the drawing shows a telephoto end state, where on-axis rays Ta and rays with the maximum angle of view Tb as the rays are denoted.

The imaging optical system of Example 1 is composed of, in order from the magnification side, a first imaging optical system G1 and a second imaging optical system G2. The first imaging optical system G1 is composed of ten lenses L1a to L1j, a first optical path deflection unit R1, and a second optical path deflection unit R2. The second imaging optical system G2 is composed of, in order from the magnification side, a second A lens group G2A composed of only one lens L2a, a second B lens group G2B composed of four lenses L2b to L2e, a second C lens group G2C composed of only of one lens L2f, a second D lens group G2D composed of four lenses L2g to L2j and an aperture stop St, a second E lens group G2E composed of two lenses L2k to L2l, and a second F lens group G2F composed of only one lens L2m. In the imaging optical system of Example 1, the second B lens group G2B corresponds to the magnification side moving group, and the second C lens group G2C, the second D lens group G2D, and the second E lens group G2E correspond to the reduction side moving group.

Table 1 shows basic lens data of the imaging optical system of Example 1, Table 2 shows data about specification, Table 3 shows data about variable surface distances, and Table 4 shows data about aspheric surface coefficients thereof. Hereinafter, meanings of the reference signs in the tables are, for example, as described in Example 1, and are basically the same as those in Examples 2 to 7.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)). Furthermore, the sign of the radius of curvature is positive in a case where a surface has a shape convex toward the magnification side, and is negative in a case where a surface has a shape convex toward the reduction side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during zooming, DD[surface number] is noted. Numerical values each corresponding to the DD[surface number] are shown in Table 3.

In the data about the specification of Table 2, values of the focal length |f|, the back focal length Bf, the F number FNo., and the total angle of view 2ω(°) are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 4 shows the surface numbers of the aspheric surfaces and aspheric surface coefficients of the aspheric surfaces. The "E±n" (n: an integer) in numerical values of the aspheric surface coefficients of Table 4 indicates "×10$^{\pm n}$". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and Σ at the aspheric surface depth Zd means the sum with respect to m.

In the basic lens data and data about specification, a degree (°) is used as a unit of angle, and a numerical value normalized with the focal length |f|=1 at the wide-angle end is described for length (distance).

TABLE 1

Example 1 Lens Data (n, ν are based on the d line)

| Surface Number | Radius of Curvature | Surface Distance | n | ν |
|---|---|---|---|---|
| *1 | −3.4642 | 0.9174 | 1.53158 | 55.08 |
| *2 | −5.7566 | 0.8460 | | |
| 3 | 15.3838 | 0.2994 | 1.80400 | 46.58 |
| 4 | 3.9734 | 2.1694 | | |
| 5 | −54.5104 | 0.2994 | 1.62299 | 58.16 |
| 6 | 4.9057 | 1.1604 | | |
| 7 | −23.4140 | 2.2177 | 1.80518 | 25.42 |
| 8 | −9.0295 | 6.6827 | | |
| 9 | −23.3515 | 0.9652 | 1.80809 | 22.76 |
| 10 | −7.8383 | 0.1183 | | |
| 11 | 13.5687 | 2.5313 | 1.43875 | 94.66 |
| 12 | −5.9854 | 0.2462 | 1.59551 | 39.24 |
| 13 | −10.3377 | 0.2559 | | |
| 14 | 35.4360 | 0.2439 | 1.84666 | 23.78 |
| 15 | 5.1777 | 2.8697 | 1.49700 | 81.61 |
| 16 | −10.0775 | 0.8014 | | |

TABLE 1-continued

Example 1 Lens Data (n, ν are based on the d line)

| Surface Number | Radius of Curvature | Surface Distance | n | ν |
|---|---|---|---|---|
| *17 | −5.9310 | 0.8510 | 1.51007 | 56.24 |
| *18 | −4.5631 | 11.0893 | | |
| 19 | 8.5158 | 3.4820 | 1.80400 | 46.58 |
| 20 | 14.9897 | DD[20] | | |
| 21 | −12.4621 | 0.3549 | 1.56732 | 42.82 |
| 22 | 10.8963 | 2.0673 | | |
| 23 | −20.3042 | 2.1414 | 1.66680 | 33.05 |
| 24 | −7.3929 | 0.0444 | | |
| 25 | 7.8537 | 2.8139 | 1.79952 | 42.22 |
| 26 | 66.4386 | 0.3797 | | |
| 27 | −97.7027 | 0.3327 | 1.60311 | 60.64 |
| 28 | 7.2803 | DD[28] | | |
| 29 | 27.3374 | 0.6463 | 1.78800 | 47.37 |
| 30 | −29.3044 | DD[30] | | |
| 31 | 5.5350 | 1.1604 | 1.80400 | 46.58 |
| 32 | −13.4472 | 0.2241 | 1.63980 | 34.47 |
| 33 | 4.0001 | 2.1443 | | |
| 34 (Stop) | ∞ | 0.6653 | | |
| 35 | −3.7727 | 0.2218 | 1.85478 | 24.80 |
| 36 | −34.0039 | 0.0444 | | |
| 37 | −2602.2407 | 0.9682 | 1.49700 | 81.61 |
| 38 | −4.2205 | DD[38] | | |
| 39 | 14.3371 | 1.7539 | 1.43875 | 94.66 |
| 40 | −5.1856 | 0.2664 | 1.78590 | 44.20 |
| 41 | −7.6376 | DD[41] | | |
| 42 | 12.2267 | 1.8455 | 1.89286 | 20.36 |
| 43 | −112.8596 | 2.2179 | | |
| 44 | ∞ | 5.5447 | 1.51633 | 64.14 |
| 45 | ∞ | 0.1109 | | |
| 46 | ∞ | 0.6654 | 1.48749 | 70.24 |
| 47 | ∞ | 0.0319 | | |

TABLE 2

Example 1 Specification (d line)

| | Wide-Angle End | Middle | Telephoto End |
|---|---|---|---|
| |f| | 1.00 | 1.42 | 1.80 |
| Bf | 6.46 | | |
| FNo. | 2.00 | 2.35 | 2.76 |
| 2ω [°] | 137.4 | 122.6 | 110.4 |

TABLE 3

Example 1 Variable Surface Distance

| | Wide-Angle End | Middle | Telephoto End |
|---|---|---|---|
| DD[20] | 3.37 | 3.28 | 3.88 |
| DD[28] | 9.13 | 4.31 | 1.25 |
| DD[30] | 0.11 | 2.21 | 2.92 |
| DD[38] | 2.93 | 1.74 | 0.11 |
| DD[41] | 1.36 | 5.36 | 8.73 |

TABLE 4

Example 1 Aspheric Surface Coefficient

| | Surface Number | | | |
|---|---|---|---|---|
| | 1 | 2 | 17 | 18 |
| KA | 1.368940540747E-01 | 3.100467501914E-01 | 1.000000000000E+00 | 1.000000000000E+00 |
| A3 | -8.488385620320E-03 | -3.143703130843E-03 | 5.853883428599E-04 | 1.600701924905E-03 |
| A4 | 3.582296243680E-02 | 2.075819200828E-02 | 1.392542581390E-03 | -6.271158107739E-04 |
| A5 | -9.326019605606E-03 | -1.074561605664E-03 | 1.033342238282E-03 | 7.375444379015E-03 |
| A6 | -7.016597535287E-04 | -2.265299557429E-03 | 2.294838764873E-04 | -5.305197362912E-03 |
| A7 | 6.964900036099E-04 | 4.382752692656E-04 | -5.070209985669E-04 | 1.392069370243E-03 |
| A8 | -5.874094212214E-05 | 6.896939929412E-05 | 1.754797954593E-05 | 7.401752466800E-04 |
| A9 | -2.405710895732E-05 | -2.227780250099E-05 | 1.284758570969E-04 | -6.975680042824E-04 |
| A10 | 4.765944077027E-06 | -1.466752831877E-06 | -2.606155130656E-05 | 1.093880102665E-04 |
| A11 | 2.868353689495E-07 | 7.560550132294E-07 | -1.357460347157E-05 | 8.898194943887E-05 |
| A12 | -1.436567001258E-07 | 4.660757172061E-09 | 3.779862991883E-06 | -3.946780471087E-05 |
| A13 | 4.630318833650E-09 | -1.502980442253E-08 | 9.034160226186E-07 | -1.240134031402E-06 |
| A14 | 2.099124645986E-09 | 2.604720237471E-10 | -2.926271292839E-07 | 3.751189331531E-06 |
| A15 | -1.843107609121E-10 | 2.058924022206E-10 | -3.917726629409E-08 | -5.175591468741E-07 |
| A16 | -1.263292218293E-11 | -8.041901173895E-12 | 1.362728190195E-08 | -1.288370093228E-07 |
| A17 | 2.101827885865E-12 | -1.551465998823E-12 | 1.004053293376E-09 | 3.629813154912E-08 |
| A18 | -1.258973565408E-14 | 8.071496668553E-14 | -3.581384042498E-10 | -2.956653551875E-11 |
| A19 | -8.457471044504E-15 | 5.735452340230E-15 | -1.124465182314E-11 | -7.251540709593E-10 |
| A20 | 3.302329024991E-16 | -3.661023978258E-16 | 4.027908776429E-12 | 5.851265644449E-11 |

Figure 8:
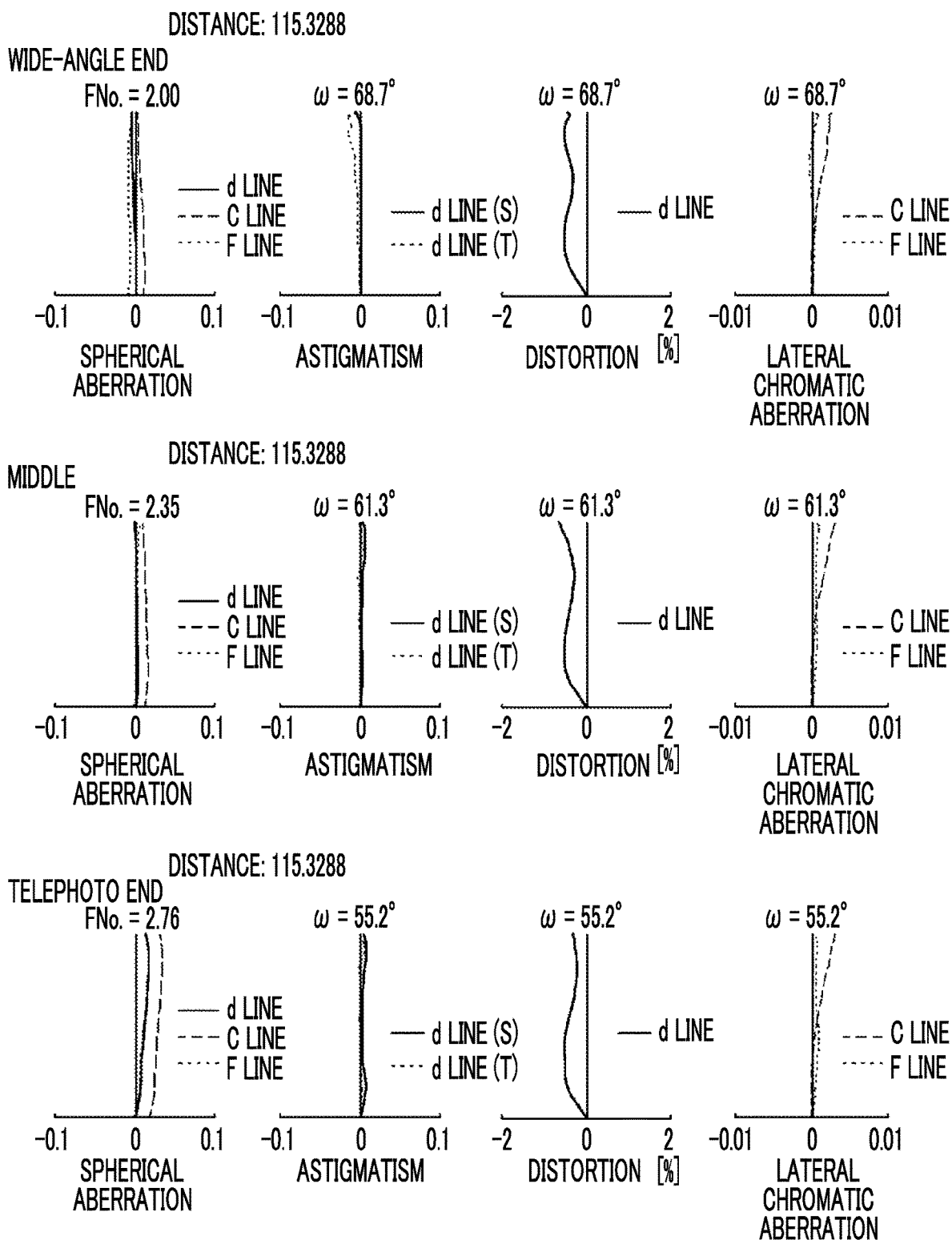
FIG. 8 is a diagram of aberrations of the imaging optical system of Example 1 of the present invention.

FIG. 8 shows a diagram of aberrations of the imaging optical system of Example 1. In addition, in each of the upper part (wide-angle end), the middle part (middle position), the lower part (telephoto end) of FIG. 8, in order from the left side, spherical aberration, astigmatism, distortion, and lateral chromatic aberration are shown in a case where the distance from the magnification side imaging surface to the first imaging optical system is set to 115.3288. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), and the F line (a wavelength of 486.1 nm (nanometers)) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (a wavelength of 656.3 nm (nanometers)) and F line (a wavelength of 486.1 nm (nanometers)) are respectively indicated by the long dashed line and the short dashed line. In addition, in the spherical aberration diagram, FNo. means an F number. In the other aberration diagrams, ω means a half angle of view.

Figure 2:
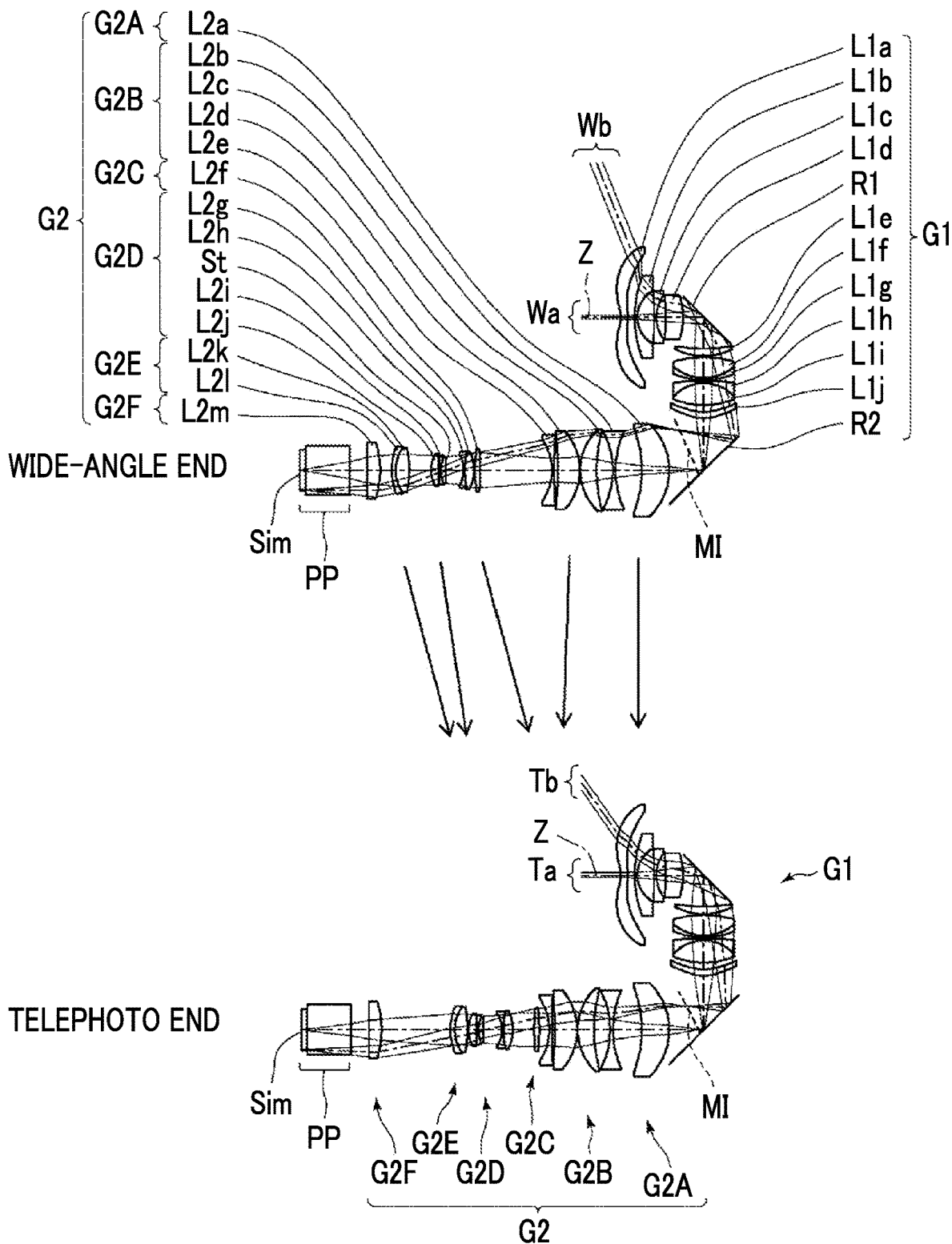
FIG. 2 is a cross-sectional view illustrating a lens configuration of an imaging optical system of Example 2 of the present invention.
Figure 9:
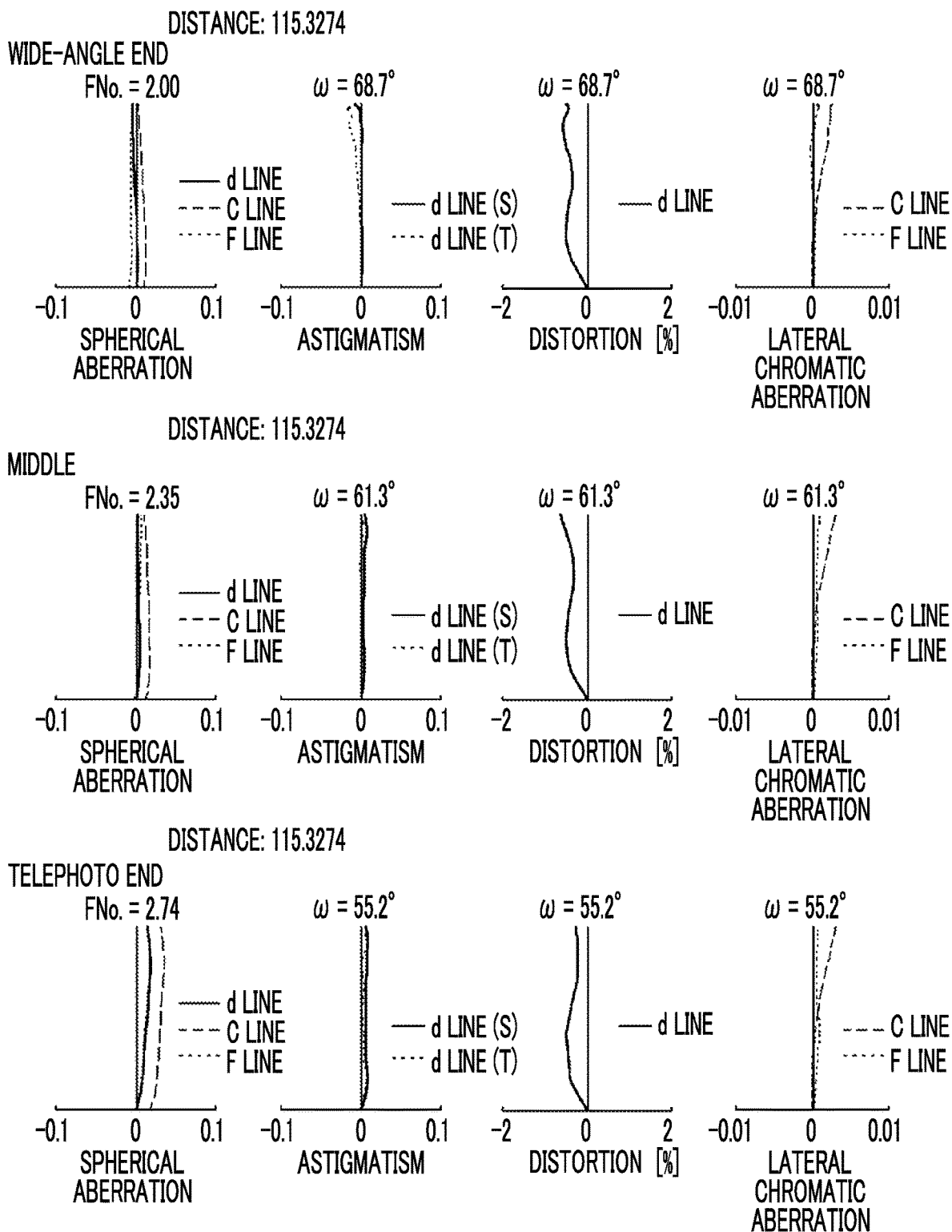
FIG. 9 is a diagram of aberrations of the imaging optical system of Example 2 of the present invention.

Next, an imaging optical system of Example 2 will be described. FIG. 2 is a cross-sectional view illustrating a lens configuration of the imaging optical system of Example 2. The group configuration of the imaging optical system of Example 2 is the same as that of the imaging optical system of Example 1 except the following point. The second A lens group G2A and the second B lens group G2B corresponds to the magnification side moving group, and the second C lens group G2C, the second D lens group G2D, and the second E lens group G2E corresponds to the reduction side moving group. Further, Table 5 shows basic lens data of the imaging optical system of Example 2, Table 6 shows data about specification, Table 7 shows data about variable surface distances, and Table 8 shows data about aspheric surface coefficients. FIG. 9 shows aberration diagrams in a case where the distance from the magnification side imaging surface to the first imaging optical system is set to 115.3274.

TABLE 5

Example 2 Lens Data (n, ν are based on the d line)

| Surface Number | Radius of Curvature | Surface Distance | n | ν |
|---|---|---|---|---|
| *1 | -3.4278 | 0.9049 | 1.53158 | 55.08 |
| *2 | -5.7024 | 0.8791 | | |
| 3 | 15.6682 | 0.2994 | 1.80400 | 46.58 |
| 4 | 3.9734 | 2.1551 | | |
| 5 | -62.1949 | 0.2994 | 1.62299 | 58.16 |
| 6 | 4.9028 | 1.1637 | | |
| 7 | -23.6297 | 2.2176 | 1.80518 | 25.42 |
| 8 | -9.1027 | 6.6826 | | |
| 9 | -24.8406 | 0.9870 | 1.80809 | 22.76 |
| 10 | -7.9452 | 0.1505 | | |
| 11 | 13.1756 | 2.6612 | 1.43875 | 94.66 |
| 12 | -6.0256 | 0.2462 | 1.59551 | 39.24 |
| 13 | -10.4214 | 0.1696 | | |
| 14 | 37.1061 | 0.2439 | 1.84666 | 23.78 |
| 15 | 5.1644 | 2.8639 | 1.49700 | 81.61 |
| 16 | -10.0525 | 0.8511 | | |
| *17 | -5.9112 | 0.8476 | 1.51007 | 56.24 |
| *18 | -4.5646 | DD[18] | | |
| 19 | 8.5299 | 3.4820 | 1.80400 | 46.58 |
| 20 | 15.2478 | DD[20] | | |
| 21 | -12.6763 | 0.3549 | 1.56732 | 42.82 |
| 22 | 10.7676 | 2.0605 | | |
| 23 | -19.9811 | 2.0944 | 1.66680 | 33.05 |
| 24 | -7.3928 | 0.0444 | | |
| 25 | 7.7933 | 2.8233 | 1.79952 | 42.22 |
| 26 | 60.5292 | 0.3865 | | |
| 27 | -95.9014 | 0.3327 | 1.60311 | 60.64 |
| 28 | 7.1833 | DD[28] | | |
| 29 | 26.7269 | 0.6715 | 1.78800 | 47.37 |
| 30 | -27.9794 | DD[30] | | |
| 31 | 5.5820 | 1.1575 | 1.80400 | 46.58 |
| 32 | -14.8685 | 0.2241 | 1.63980 | 34.47 |
| 33 | 4.0410 | 2.2483 | | |
| 34 (Stop) | ∞ | 0.6653 | | |
| 35 | -3.8473 | 0.2218 | 1.85478 | 24.80 |
| 36 | -40.4076 | 0.0444 | | |
| 37 | 222.6080 | 0.9786 | 1.49700 | 81.61 |
| 38 | -4.2341 | DD[38] | | |
| 39 | 13.7253 | 1.7116 | 1.43875 | 94.66 |
| 40 | -5.1881 | 0.5422 | 1.78590 | 44.20 |
| 41 | -7.8120 | DD[41] | | |
| 42 | 12.0137 | 1.6542 | 1.89286 | 20.36 |
| 43 | -142.0376 | 2.2178 | | |
| 44 | ∞ | 5.5446 | 1.51633 | 64.14 |

TABLE 5-continued

Example 2 Lens Data (n, ν are based on the d line)

| Surface Number | Radius of Curvature | Surface Distance | n | ν |
|---|---|---|---|---|
| 45 | ∞ | 0.1109 | | |
| 46 | ∞ | 0.6654 | 1.48749 | 70.24 |
| 47 | ∞ | 0.0318 | | |

TABLE 6

Example 2 Specification (d line)

| | Wide-Angle End | Middle | Telephoto End |
|---|---|---|---|
| \|f\| | 1.00 | 1.42 | 1.80 |
| Bf | 6.46 | | |
| FNo. | 2.00 | 2.35 | 2.74 |
| 2ω [°] | 137.4 | 122.6 | 110.4 |

TABLE 7

Example 2 Variable Surface Distance

| | Wide-Angle End | Middle | Telephoto End |
|---|---|---|---|
| DD[18] | 11.18 | 11.22 | 11.38 |
| DD[20] | 3.33 | 3.20 | 3.65 |
| DD[28] | 9.01 | 4.27 | 1.27 |
| DD[30] | 0.11 | 2.09 | 2.70 |
| DD[38] | 2.77 | 1.63 | 0.11 |
| DD[41] | 1.44 | 5.43 | 8.74 |

TABLE 8

Example 2 Aspheric Surface Coefficient

| | Surface Number | | | |
|---|---|---|---|---|
| | 1 | 2 | 17 | 18 |
| KA | 1.347845401555E−01 | 3.139001856017E−01 | 1.000000000000E+00 | 1.000000000000E+00 |
| A3 | −8.401433460758E−03 | −3.003098334035E−03 | 6.482820386726E−04 | 1.863528890342E−03 |
| A4 | 3.635794804450E−02 | 2.105318578887E−02 | 8.151594834961E−04 | −1.387023226099E−03 |
| A5 | −9.505334738592E−03 | −1.107736187289E−03 | 1.350161903432E−03 | 7.738958092922E−03 |
| A6 | −7.191126513198E−04 | −2.295593060806E−03 | 2.488102341535E−04 | −5.220445065354E−03 |
| A7 | 7.142469940398E−04 | 4.407987954941E−04 | −6.315085715986E−04 | 1.214535639146E−03 |
| A8 | −6.020044597994E−05 | 7.121121593496E−05 | 3.691703591970E−05 | 7.707328452950E−04 |
| A9 | −2.483508221274E−05 | −2.247319306588E−05 | 1.542927183606E−04 | −6.673798610487E−04 |
| A10 | 4.923005900237E−06 | −1.556881829174E−06 | −3.300924717795E−05 | 9.897235964114E−05 |
| A11 | 2.986980886603E−07 | 7.638000071253E−07 | −1.637554434555E−05 | 8.657934625022E−05 |
| A12 | −1.493890494740E−07 | 6.956781218721E−09 | 4.747771030448E−06 | −3.807239128195E−05 |
| A13 | 4.809839275446E−09 | −1.521886940299E−08 | 1.088611133476E−06 | −1.193457680650E−06 |
| A14 | 2.197188222084E−09 | 2.256740590270E−10 | −3.676645934796E−07 | 3.653378278016E−06 |
| A15 | −1.933253237137E−10 | 2.082276502129E−10 | −4.685736959315E−08 | −5.110166290618E−07 |
| A16 | −1.330997825250E−11 | −7.695393517760E−12 | 1.707098764412E−08 | −1.254452469622E−07 |
| A17 | 2.220043725002E−12 | −1.566487868514E−12 | 1.191839334383E−09 | 3.582200891663E−08 |
| A18 | −1.333062435438E−14 | 7.869820554035E−14 | −4.465599402503E−10 | −6.556047307629E−11 |
| A19 | −8.992681869239E−15 | 5.759935199069E−15 | −1.331286164559E−11 | −7.154609866379E−10 |
| A20 | 3.523284749764E−16 | −3.595094893134E−16 | 5.007243319333E−12 | 5.806786587750E−11 |

Figure 3:
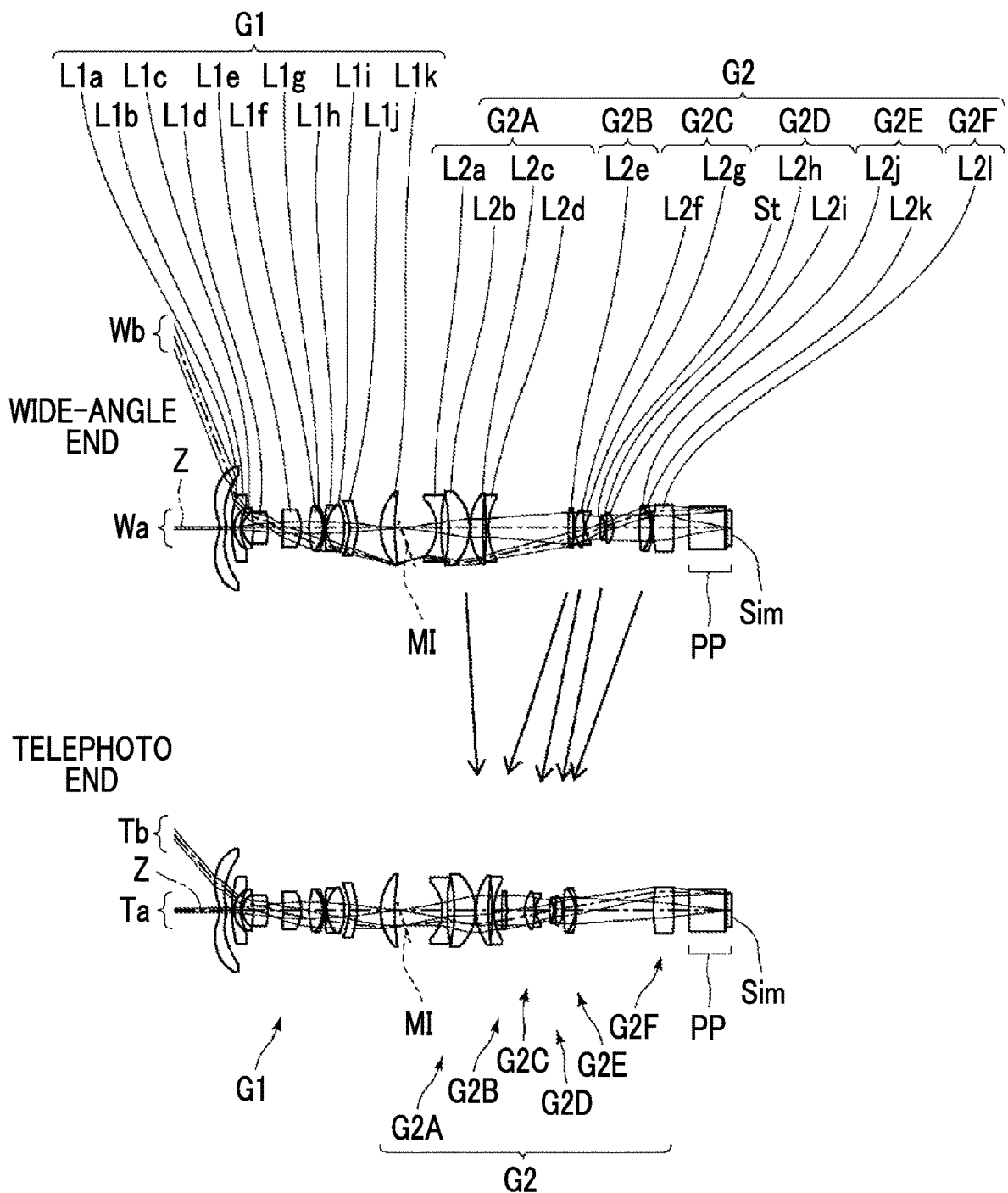
FIG. 3 is a cross-sectional view illustrating a lens configuration of an imaging optical system of Example 3 of the present invention.

Next, an imaging optical system of Example 3 will be described. FIG. 3 is a cross-sectional view illustrating a lens configuration of the imaging optical system of Example 3.

In the imaging optical system of Example 3, the first imaging optical system G1 is composed of eleven lenses L1a to L1k. The second imaging optical system G2 is composed of, in order from the magnification side, a second A lens group G2A composed of four lenses L2a to L2d, a second B lens group G2B composed of only one lens L2e, a second C lens group G2C composed of two lenses L2f and L2g, a second D lens group G2D composed of two lenses L2h and L2i and an aperture stop St, a second E lens group G2E composed of two lenses L2j to L2k, and a second F lens group G2F composed of only one lens L2l. In the imaging optical system of Example 3, the second A lens group G2A corresponds to the magnification side moving group, and the second B lens group G2B, the second C lens group G2C, the second D lens group G2D, and the second E lens group G2E correspond to the reduction side moving group.

Figure 10:
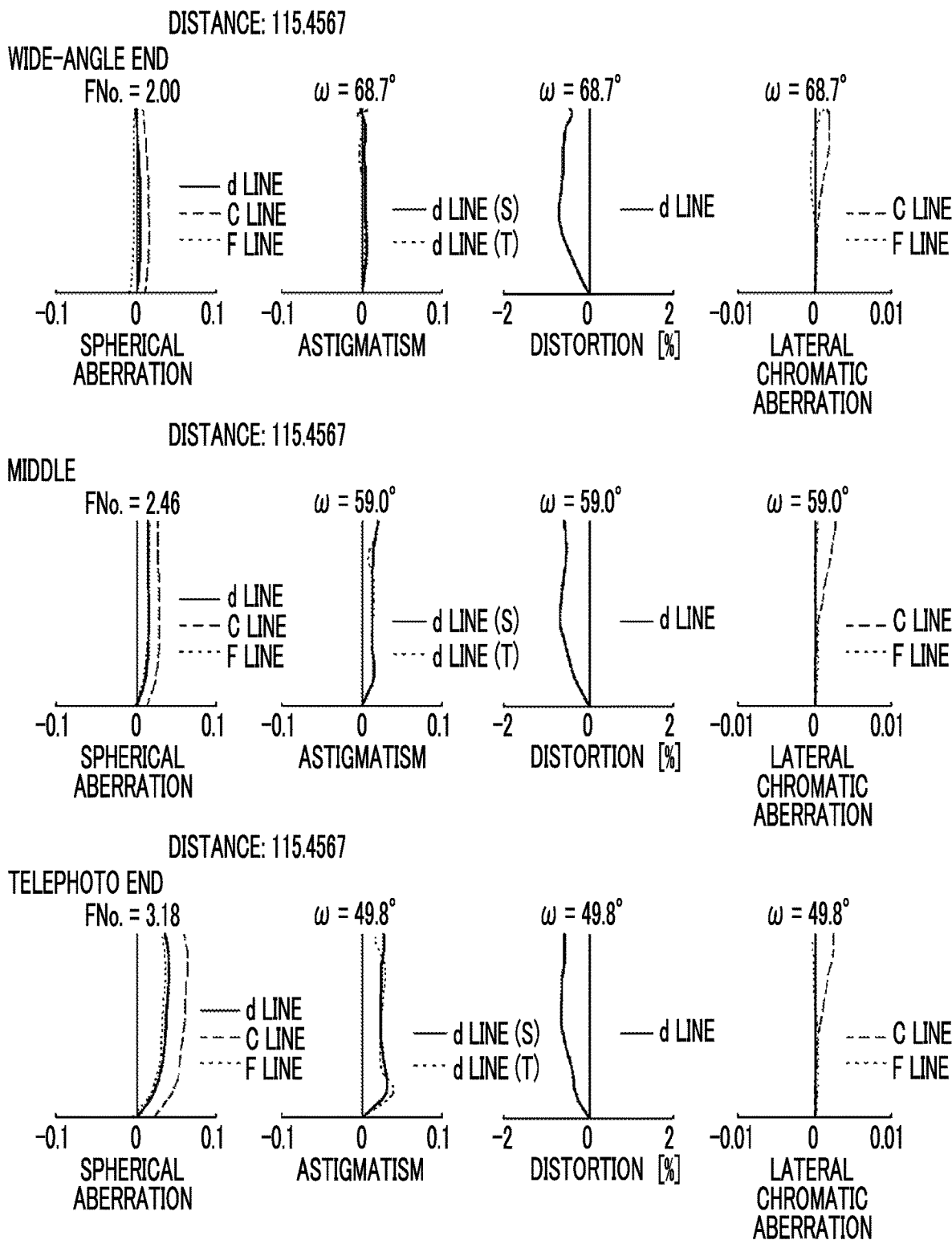
FIG. 10 is a diagram of aberrations of the imaging optical system of Example 3 of the present invention.

Further, Table 9 shows basic lens data of Example 3, Table 10 shows data about specification, Table 11 shows data about variable surface distances, and Table 12 shows data about aspheric surface coefficients. FIG. 10 shows aberration diagrams in a case where the distance from the magnification side imaging surface to the first imaging optical system is set to 115.4567.

TABLE 9

Example 3 Lens Data (n, ν are based on the d line)

| Surface Number | Radius of Curvature | Surface Distance | n | ν |
|---|---|---|---|---|
| *1 | −3.0403 | 0.9990 | 1.53158 | 55.08 |
| *2 | −4.6881 | 0.8297 | | |
| 3 | 19.1485 | 0.3260 | 1.60311 | 60.64 |
| 4 | 3.6304 | 0.9924 | | |
| 5 | 5.6638 | 0.2999 | 1.58913 | 61.13 |
| 6 | 2.7462 | 1.6661 | | |
| 7 | −13.9172 | 2.2203 | 1.80440 | 39.59 |
| 8 | −9.4825 | 2.2698 | | |
| 9 | −15.0039 | 2.6642 | 1.80809 | 22.76 |
| 10 | −5.8450 | 1.2307 | | |

TABLE 9-continued

Example 3 Lens Data (n, ν are based on the d line)

| Surface Number | Radius of Curvature | Surface Distance | n | ν |
|---|---|---|---|---|
| 11 | 11.0738 | 2.0761 | 1.43875 | 94.66 |
| 12 | −4.8838 | 0.2442 | 1.84666 | 23.78 |
| 13 | −6.8630 | 0.0446 | | |

TABLE 9-continued

Example 3 Lens Data (n, ν are based on the d line)

| Surface Number | Radius of Curvature | Surface Distance | n | ν |
|---|---|---|---|---|
| 14 | 31.5750 | 0.2443 | 1.84666 | 23.78 |
| 15 | 4.7241 | 2.6505 | 1.49700 | 81.61 |
| 16 | −8.8735 | 0.7803 | | |
| *17 | −5.1336 | 1.2212 | 1.51007 | 56.24 |
| *18 | −4.2456 | 3.4224 | | |
| 19 | 8.3082 | 2.1531 | 1.75500 | 52.32 |
| 20 | 41.0961 | DD[20] | | |
| 21 | −6.0291 | 0.6635 | 1.53172 | 48.84 |
| 22 | 24.8533 | 1.1629 | | |
| 23 | −21.5000 | 3.1422 | 1.75520 | 27.51 |
| 24 | −7.5173 | 0.0444 | | |
| 25 | 8.7946 | 1.8919 | 1.80400 | 46.58 |
| 26 | 38.9088 | 0.5410 | | |
| 27 | −81.5191 | 0.3330 | 1.51680 | 64.20 |
| 28 | 8.8497 | DD[28] | | |
| 29 | 20.7179 | 0.7872 | 1.72916 | 54.68 |
| 30 | −27.2645 | DD[30] | | |
| 31 | 4.7581 | 1.4263 | 1.77250 | 49.60 |
| 32 | −17.1095 | 0.2244 | 1.62004 | 36.26 |
| 33 | 3.2579 | DD[33] | | |
| 34 (Stop) | ∞ | 0.6659 | | |
| 35 | −3.3143 | 0.2220 | 1.85478 | 24.80 |
| 36 | −29.1789 | 0.0446 | | |
| 37 | −48.9097 | 1.0625 | 1.53775 | 74.70 |
| 38 | −3.7675 | DD[38] | | |
| 39 | 21.5354 | 1.6985 | 1.49700 | 81.61 |

TABLE 10

Example 3 Specification (d line)

| | Wide-Angle End | Middle | Telephoto End |
|---|---|---|---|
| \|f'\| | 1.00 | 1.56 | 2.20 |
| Bf' | 6.47 | | |
| FNo. | 2.00 | 2.46 | 3.18 |
| 2ω [°] | 137.4 | 118.0 | 99.6 |

TABLE 11

Example 3 Variable Surface Distance

| | Wide-Angle End | Middle | Telephoto End |
|---|---|---|---|
| DD[20] | 6.21 | 6.25 | 7.09 |
| DD[28] | 11.92 | 5.32 | 1.15 |
| DD[30] | 0.11 | 2.36 | 2.57 |
| DD[33] | 2.25 | 2.13 | 2.07 |
| DD[38] | 3.83 | 2.65 | 0.11 |
| DD[41] | 0.11 | 5.72 | 11.43 |

TABLE 12

Example 3 Aspheric Surface Coefficient

| | Surface Number | | | |
|---|---|---|---|---|
| | 1 | 2 | 17 | 18 |
| KA | 1.005764734896E−01 | 2.111980444758E−01 | 1.000000000000E+00 | 1.000000000000E+00 |
| A3 | −1.111208897391E−02 | −4.157765105297E−03 | −4.769498260039E−03 | 3.551067070701E−04 |
| A4 | 3.933859651679E−02 | 2.088979642499E−02 | 1.501274429953E−02 | 4.394501513035E−03 |
| A5 | −1.000546119825E−02 | −3.031984217788E−04 | −6.259638610385E−03 | 8.681597197240E−03 |
| A6 | −7.595417000069E−04 | −2.309315712966E−03 | −3.860396617454E−04 | −8.312133417475E−03 |
| A7 | 7.299264707964E−04 | 3.429606964983E−04 | 2.590581194700E−03 | 2.775101304962E−03 |
| A8 | −6.080184720310E−05 | 8.338356826428E−05 | −9.207672184590E−04 | 1.232843296827E−03 |
| A9 | −2.425955935995E−05 | −1.795566193318E−05 | −2.790905382281E−04 | −1.298181901135E−03 |
| A10 | 4.726726282203E−06 | −2.426192241463E−06 | 2.041733918139E−04 | 1.972070112329E−04 |
| A11 | 2.810910649902E−07 | 6.640267147325E−07 | 8.194177472307E−06 | 1.779049194122E−04 |
| A12 | −1.372613470757E−07 | 3.573316826676E−08 | −2.547135420044E−05 | −7.880426995563E−05 |
| A13 | 4.207163289706E−09 | −1.446185139906E−08 | 2.293134041490E−06 | −2.895194746682E−06 |
| A14 | 1.944224752209E−09 | −2.720983714725E−10 | 1.774664550482E−06 | 8.255774414307E−06 |
| A15 | −1.645176998580E−10 | 2.141596013514E−10 | −3.188473363277E−07 | −1.226392085066E−06 |
| A16 | −1.149328423016E−11 | −3.030133398860E−12 | −5.891787171096E−08 | −3.080194853897E−07 |
| A17 | 1.825529493094E−12 | −1.708687156627E−12 | 1.662694411610E−08 | 9.586110508611E−08 |
| A18 | −8.794541260009E−15 | 5.833484224811E−14 | 3.126009218368E−10 | −6.135577388858E−10 |
| A19 | −7.153947833845E−15 | 6.385909785857E−15 | −3.166399763451E−10 | −2.129843830861E−09 |
| A20 | 2.708551024032E−16 | −3.289093024177E−16 | 1.855742095512E−11 | 1.890757000932E−10 |

TABLE 9-continued

Example 3 Lens Data (n, ν are based on the d line)

| Surface Number | Radius of Curvature | Surface Distance | n | ν |
|---|---|---|---|---|
| 40 | −5.1752 | 0.2688 | 1.60311 | 60.64 |
| 41 | −9.4310 | DD[41] | | |
| 42 | 15.6707 | 3.0745 | 1.89286 | 20.36 |
| 43 | −47.9109 | 2.2203 | | |
| 44 | ∞ | 5.5508 | 1.51633 | 64.14 |
| 45 | ∞ | 0.1110 | | |
| 46 | ∞ | 0.6661 | 1.48749 | 70.24 |
| 47 | ∞ | 0.0370 | | |

Figure 4:
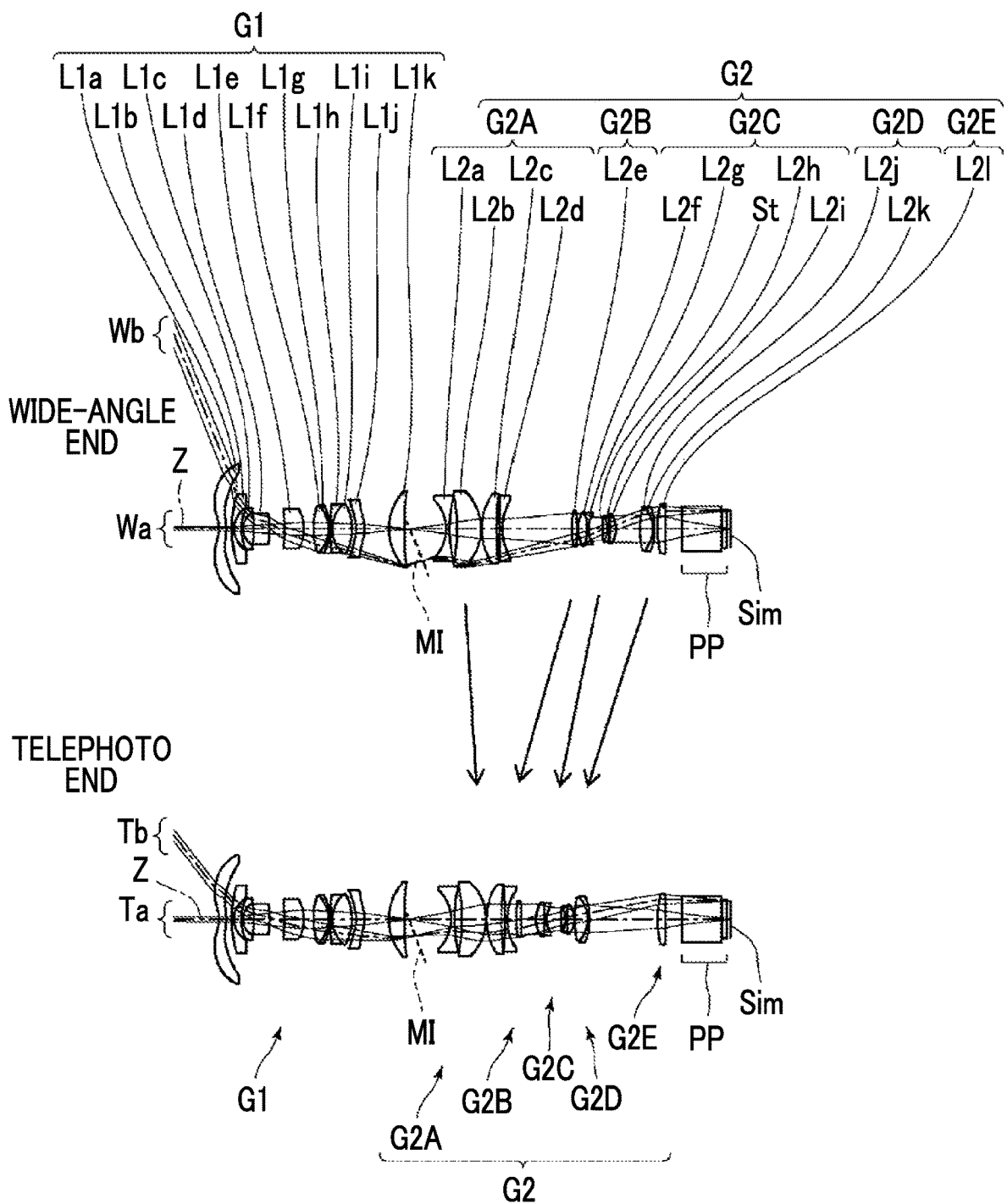
FIG. 4 is a cross-sectional view illustrating a lens configuration of an imaging optical system of Example 4 of the present invention.

Next, an imaging optical system of Example 4 will be described. FIG. 4 is a cross-sectional view illustrating a lens configuration of the imaging optical system of Example 4.

In the imaging optical system of Example 4, the first imaging optical system G1 is composed of eleven lenses L1a to L1k. The second imaging optical system G2 is composed of, in order from the magnification side, a second A lens group G2A composed of four lenses L2a to L2d, a second B lens group G2B composed of only one lens L2e, a second C lens group G2C composed of four lenses L2f to L2i and an aperture stop St, a second D lens group G2D composed of two lenses L2j and L2k, and a second E lens group G2E composed of only one lens L2l. In the imaging optical system of Example 4, the second A lens group G2A corresponds to the magnification side moving group, and the second B lens group G2B, the second C lens group G2C, and the second D lens group G2D correspond to the reduction side moving group.

Figure 11:
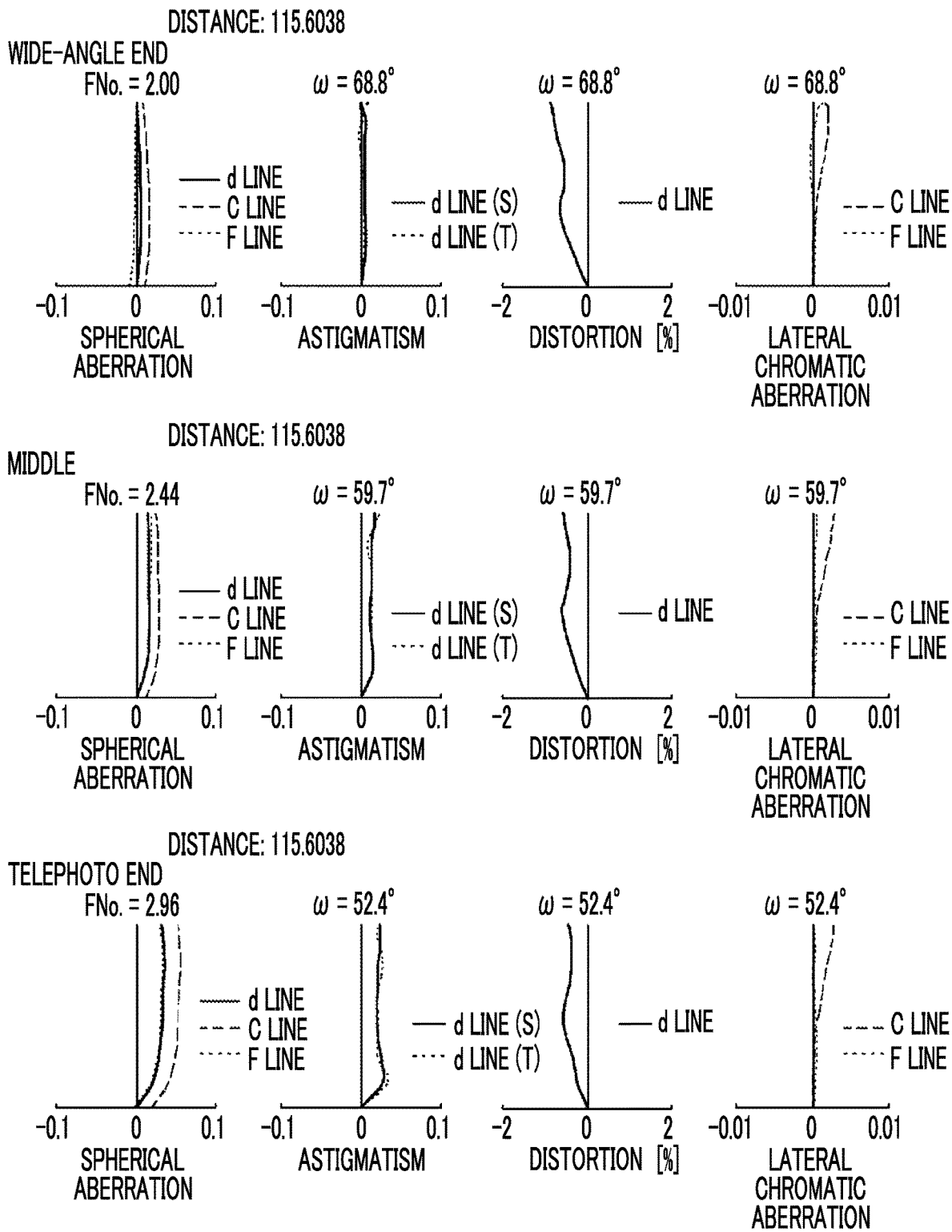
FIG. 11 is a diagram of aberrations of the imaging optical system of Example 4 of the present invention.

Further, Table 13 shows basic lens data of the imaging optical system of Example 4, Table 14 shows data about specification, Table 15 shows data about variable surface distances, and Table 16 shows data about aspheric surface coefficients. FIG. 11 shows aberration diagrams in a case where the distance from the magnification side imaging surface to the first imaging optical system is set to 115.6038.

TABLE 13

Example 4 Lens Data (n, ν are based on the d line)

| Surface Number | Radius of Curvature | Surface Distance | n | ν |
|---|---|---|---|---|
| *1 | −3.0232 | 1.0002 | 1.53158 | 55.08 |
| *2 | −4.7216 | 0.7498 | | |
| 3 | 17.5245 | 0.3002 | 1.60311 | 60.64 |
| 4 | 3.4909 | 0.9762 | | |
| 5 | 5.5623 | 0.3003 | 1.58913 | 61.13 |
| 6 | 2.6059 | 1.5789 | | |
| 7 | −13.8936 | 2.2232 | 1.80400 | 46.58 |
| 8 | −9.5745 | 2.0906 | | |
| 9 | −13.8207 | 2.6678 | 1.80809 | 22.76 |
| 10 | −5.5762 | 1.3187 | | |
| 11 | 10.9204 | 2.0769 | 1.43875 | 94.66 |
| 12 | −4.9269 | 0.2447 | 1.84666 | 23.78 |
| 13 | −7.0438 | 0.0444 | | |
| 14 | 31.7294 | 0.2446 | 1.84666 | 23.78 |
| 15 | 4.7390 | 2.7350 | 1.49700 | 81.61 |
| 16 | −8.0819 | 0.5898 | | |
| *17 | −5.1586 | 1.2229 | 1.51007 | 56.24 |
| *18 | −4.2232 | 3.3524 | | |
| 19 | 7.9886 | 2.1563 | 1.72916 | 54.68 |
| 20 | 46.4616 | DD[20] | | |
| 21 | −5.8619 | 0.4740 | 1.51742 | 52.43 |
| 22 | 19.9820 | 1.0714 | | |
| 23 | −23.9155 | 3.3346 | 1.75520 | 27.51 |
| 24 | −7.4105 | 0.0444 | | |
| 25 | 8.4326 | 2.1820 | 1.80400 | 46.58 |
| 26 | 37.1383 | 0.4804 | | |
| 27 | −76.1032 | 0.3335 | 1.51680 | 64.20 |
| 28 | 8.1542 | DD[28] | | |
| 29 | 18.0995 | 0.7246 | 1.75500 | 52.32 |
| 30 | −26.6593 | DD[30] | | |

TABLE 13-continued

Example 4 Lens Data (n, ν are based on the d line)

| Surface Number | Radius of Curvature | Surface Distance | n | ν |
|---|---|---|---|---|
| 31 | 4.7507 | 1.2237 | 1.77250 | 49.60 |
| 32 | −12.9648 | 0.2247 | 1.62588 | 35.70 |
| 33 | 3.2154 | 1.9973 | | |
| 34 (Stop) | ∞ | 0.6671 | | |
| 35 | −3.1808 | 0.2223 | 1.85478 | 24.80 |
| 36 | −35.4095 | 0.0445 | | |
| 37 | −77.6237 | 0.9274 | 1.59282 | 68.62 |
| 38 | −3.7088 | DD[38] | | |
| 39 | 17.4651 | 1.7735 | 1.43875 | 94.66 |
| 40 | −4.7181 | 0.2689 | 1.51680 | 64.20 |
| 41 | −8.7731 | DD[41] | | |
| 42 | 13.9313 | 1.1705 | 1.89286 | 20.36 |
| 43 | −60.5099 | 2.2231 | | |
| 44 | ∞ | 5.5579 | 1.51633 | 64.14 |
| 45 | ∞ | 0.1112 | | |
| 46 | ∞ | 0.6669 | 1.48749 | 70.24 |
| 47 | ∞ | 0.4113 | | |

TABLE 14

Example 4 Specification (d line)

| | Wide-Angle End | Middle | Telephoto End |
|---|---|---|---|
| \|f'\| | 1.00 | 1.52 | 2.00 |
| Bf | 6.85 | | |
| FNo. | 2.00 | 2.44 | 2.96 |
| 2ω [°] | 137.6 | 119.4 | 104.8 |

TABLE 15

Example 4 Variable Surface Distance

| | Wide-Angle End | Middle | Telephoto End |
|---|---|---|---|
| DD[20] | 5.83 | 5.92 | 6.51 |
| DD[28] | 9.58 | 4.18 | 1.11 |
| DD[30] | 0.11 | 1.76 | 2.06 |
| DD[38] | 3.36 | 2.06 | 0.11 |
| DD[41] | 0.35 | 5.31 | 9.43 |

TABLE 16

Example 4 Aspheric Surface Coefficient

| | Surface Number | | | |
|---|---|---|---|---|
| | 1 | 2 | 17 | 18 |
| KA | 1.063953731726E−01 | 2.533921312017E−01 | 1.000000000000E+00 | 1.000000000000E+00 |
| A3 | −1.343368074230E−02 | −6.616756051408E−03 | −4.913088136835E−03 | 5.335729105939E−04 |
| A4 | 4.404853706589E−02 | 2.454774603850E−02 | 1.534266618541E−02 | 3.933814228362E−03 |
| A5 | −1.154027732657E−02 | −5.876686387602E−04 | −6.826647030159E−03 | 9.368239257039E−03 |
| A6 | −9.170483211122E−04 | −2.857577450931E−03 | −4.083648962235E−05 | −8.699102686930E−03 |
| A7 | 9.007278233371E−04 | 4.589617446230E−04 | 2.854564912270E−03 | 2.921958230122E−03 |
| A8 | −7.677620871129E−05 | 1.088112298851E−04 | −1.238115424635E−03 | 1.311524596758E−03 |
| A9 | −3.202214336242E−05 | −2.555870329397E−05 | −2.785279841798E−04 | −1.434691215384E−03 |
| A10 | 6.405826593632E−06 | −3.241787065909E−06 | 2.822971751874E−04 | 2.258891667058E−04 |
| A11 | 3.981034550651E−07 | 9.802884036618E−07 | −2.304296543986E−06 | 2.049571706098E−04 |
| A12 | −1.986513201119E−07 | 4.758483243808E−08 | −3.597203507627E−05 | −9.076727784688E−05 |
| A13 | 6.230686419004E−09 | −2.215693536038E−08 | 4.522757347590E−06 | −4.264526368601E−06 |
| A14 | 3.000405214396E−09 | −3.297668558656E−10 | 2.542073836338E−06 | 9.755812642149E−06 |
| A15 | −2.617275013908E−10 | 3.393360025059E−10 | −5.363245197639E−07 | −1.349136350358E−06 |
| A16 | −1.888718327827E−11 | −5.632163314850E−12 | −8.461212386774E−08 | −3.812510831578E−07 |
| A17 | 3.098585504705E−12 | −2.817629651222E−12 | 2.712164273279E−08 | 1.105564549327E−07 |
| A18 | −1.569440566746E−14 | 1.012031032780E−13 | 3.557385698069E−10 | 6.731534720225E−11 |
| A19 | −1.294187648598E−14 | 1.101225978838E−14 | −5.172470451107E−10 | −2.524872094653E−09 |
| A20 | 5.069745537179E−16 | −5.843877705079E−16 | 3.112009760899E−11 | 2.175532973118E−10 |

Figure 5:
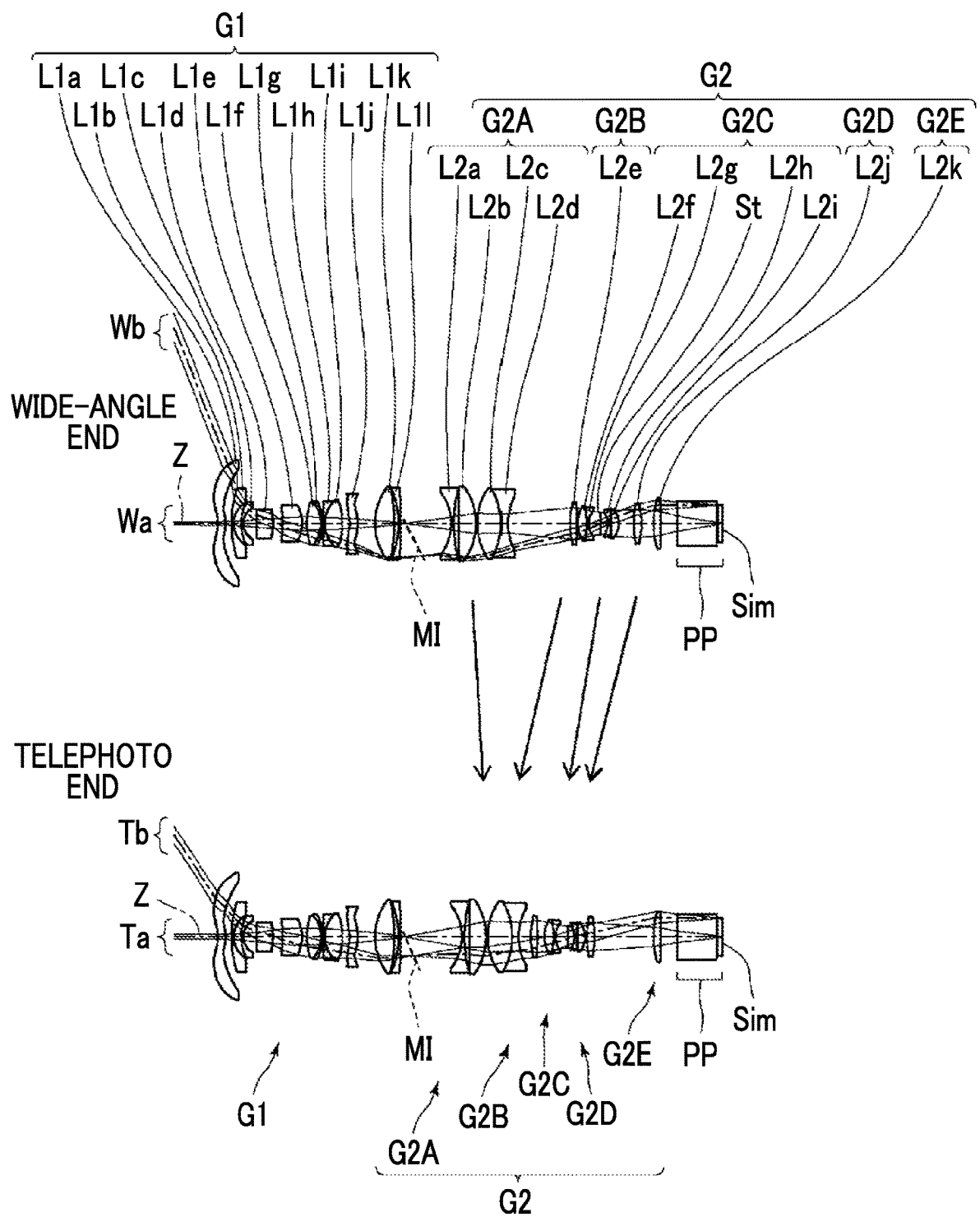
FIG. 5 is a cross-sectional view illustrating a lens configuration of an imaging optical system of Example 5 of the present invention.

Next, an imaging optical system of Example 5 will be described. FIG. 5 is a cross-sectional view illustrating a lens configuration of the imaging optical system of Example 5.

In the imaging optical system of Example 5, the first imaging optical system G1 is composed of twelve lenses L1a to L1l. The second imaging optical system G2 is composed of, in order from the magnification side, a second A lens group G2A composed of four lenses L2a to L2d, a second B lens group G2B composed of only one lens L2e, a second C lens group G2C composed of the four lenses L2f to L2i and an aperture stop St, a second D lens group G2D composed only of one lens L2j, and a second E lens group G2E composed of only one lens L2k. In the imaging optical system of Example 5, the second A lens group G2A corresponds to the magnification side moving group, and the second B lens group G2B, the second C lens group G2C, and the second D lens group G2D correspond to the reduction side moving group.

Figure 12:
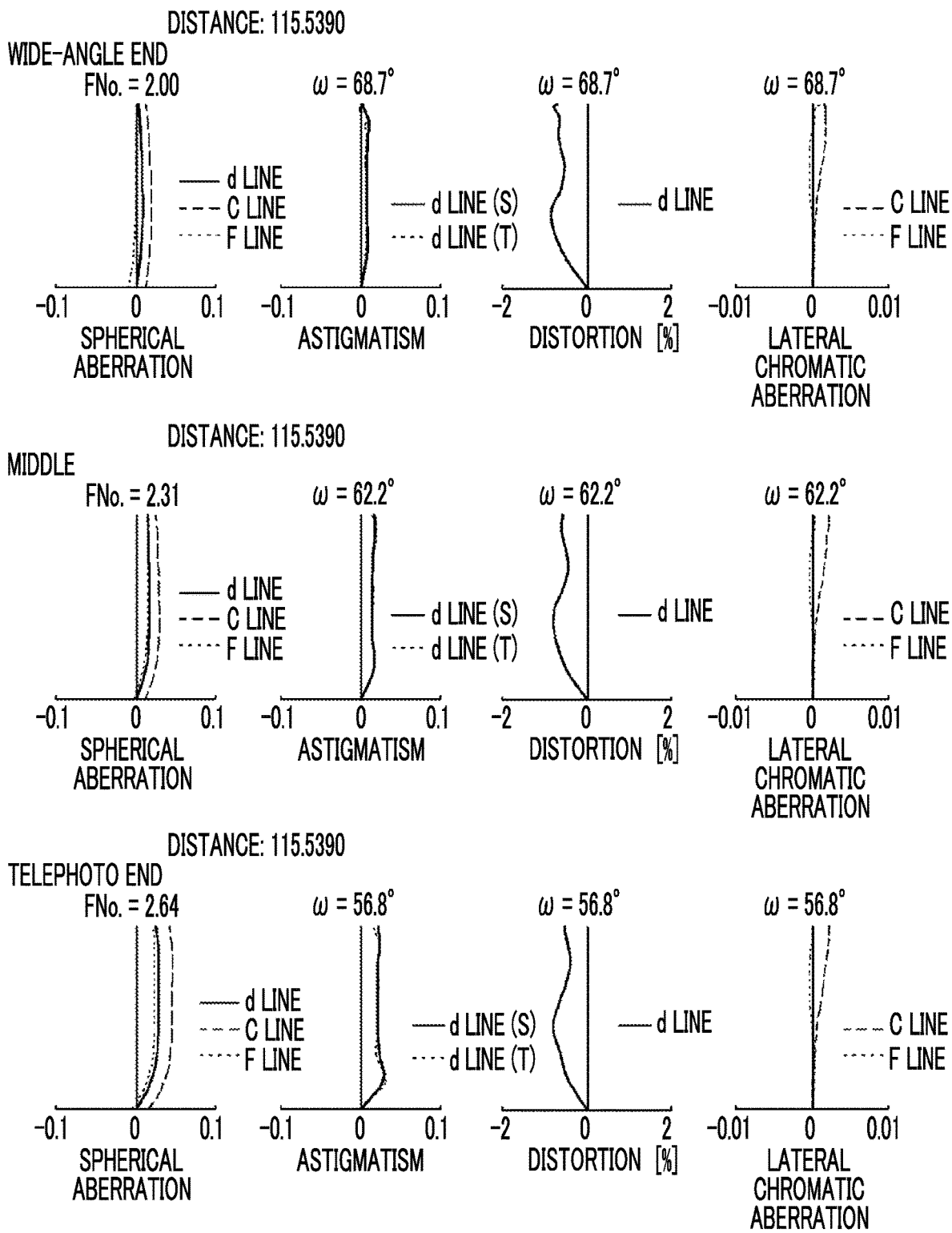
FIG. 12 is a diagram of aberrations of the imaging optical system of Example 5 of the present invention.

Further, Table 17 shows basic lens data of the imaging optical system of Example 5, Table 18 shows data about specification, Table 19 shows data about variable surface distances, and Table 20 shows data about aspheric surface coefficients. FIG. 12 shows aberration diagrams in a case where the distance from the magnification side imaging surface to the first imaging optical system is set to 115.5390.

TABLE 17

Example 5 Lens Data (n, ν are based on the d line)

| Surface Number | Radius of Curvature | Surface Distance | n | ν |
|---|---|---|---|---|
| *1 | −3.3188 | 0.9998 | 1.53158 | 55.08 |
| *2 | −5.5047 | 0.8300 | | |
| 3 | 15.6682 | 0.3127 | 1.60311 | 60.64 |
| 4 | 3.4596 | 1.0972 | | |
| 5 | 6.3170 | 0.2999 | 1.58913 | 61.13 |
| 6 | 2.5247 | 1.8485 | | |
| 7 | −26.7653 | 2.2221 | 1.80518 | 25.42 |
| 8 | −11.6982 | 1.3708 | | |
| 9 | −13.4549 | 2.6662 | 1.80809 | 22.76 |
| 10 | −5.4230 | 0.7012 | | |
| 11 | 11.2063 | 1.9115 | 1.43875 | 94.66 |
| 12 | −4.6487 | 0.2443 | 1.84666 | 23.78 |
| 13 | −6.6346 | 0.0445 | | |
| 14 | 39.3489 | 0.2443 | 1.84666 | 23.78 |
| 15 | 4.5391 | 2.4093 | 1.49700 | 81.61 |
| 16 | −9.7022 | 1.0230 | | |
| *17 | −5.0527 | 1.1324 | 1.51007 | 56.24 |
| *18 | −4.1474 | 2.3512 | | |
| 19 | 8.4822 | 2.6683 | 1.77250 | 49.60 |
| 20 | −23.9302 | 0.6082 | | |
| 21 | −12.4171 | 0.2666 | 1.80518 | 25.42 |
| 22 | −69.4243 | DD[22] | | |

TABLE 17-continued

Example 5 Lens Data (n, ν are based on the d line)

| Surface Number | Radius of Curvature | Surface Distance | n | ν |
|---|---|---|---|---|
| 23 | −7.1720 | 0.3333 | 1.48749 | 70.24 |
| 24 | 20.0426 | 0.7020 | | |
| 25 | 637.8241 | 2.3891 | 1.78472 | 25.68 |
| 26 | −8.7613 | 0.1818 | | |
| 27 | 8.7296 | 3.2784 | 1.80000 | 29.84 |
| 28 | −10.0996 | 0.8886 | 1.80518 | 25.42 |
| 29 | 8.2334 | DD[29] | | |
| 30 | 12.9537 | 0.8890 | 1.77250 | 49.60 |
| 31 | −33.7486 | DD[31] | | |
| 32 | 4.6054 | 1.2283 | 1.80400 | 46.58 |
| 33 | −19.6917 | 0.2868 | 1.64769 | 33.79 |
| 34 | 2.9766 | 1.6916 | | |
| 35 (Stop) | ∞ | 0.9413 | | |
| 36 | −3.0396 | 0.4170 | 1.85478 | 24.80 |
| 37 | −64.5688 | 0.0445 | | |
| 38 | −3399.2630 | 1.0302 | 1.53775 | 74.70 |
| 39 | −3.4574 | DD[39] | | |
| 40 | 18.2799 | 1.0408 | 1.49700 | 81.61 |
| 41 | −11.6810 | DD[41] | | |
| 42 | 11.8555 | 1.0117 | 1.89286 | 20.36 |
| 43 | −63.5324 | 2.2219 | | |
| 44 | ∞ | 5.5548 | 1.51633 | 64.14 |
| 45 | ∞ | 0.1111 | | |
| 46 | ∞ | 0.6666 | 1.48749 | 70.24 |
| 47 | ∞ | 0.0329 | | |

TABLE 18

Example 5 Specification (d line)

| | Wide-Angle End | Middle | Telephoto End |
|---|---|---|---|
| |f'| | 1.00 | 1.37 | 1.70 |
| Bf | 6.47 | | |
| FNo. | 2.00 | 2.31 | 2.64 |
| 2ω [°] | 137.4 | 124.4 | 113.6 |

TABLE 19

Example 5 Variable Surface Distance

| | Wide-Angle End | Middle | Telephoto End |
|---|---|---|---|
| DD[22] | 7.00 | 7.78 | 8.48 |
| DD[29] | 8.61 | 4.32 | 1.70 |
| DD[31] | 0.11 | 0.82 | 0.95 |
| DD[39] | 2.12 | 1.36 | 0.28 |
| DD[41] | 1.67 | 5.24 | 8.12 |

TABLE 20

Example 5 Aspheric Surface Coefficient

| | Surface Number | | | |
|---|---|---|---|---|
| | 1 | 2 | 17 | 18 |
| KA | 1.343767402509E−01 | 4.149479899337E−01 | 1.000000000000E+00 | 1.000000000000E+00 |
| A3 | −2.469260251971E−02 | −1.578798615842E−02 | −2.178719411121E−03 | 4.410887061653E−03 |
| A4 | 4.835257716511E−02 | 2.714622761074E−02 | 1.357062303123E−02 | 4.281982317448E−05 |
| A5 | −1.185839284652E−02 | −9.628464746713E−05 | 9.880110959183E−06 | 1.371156372682E−02 |
| A6 | −1.243469334833E−03 | −3.234815309111E−03 | −3.704958256788E−03 | −7.128460006327E−03 |
| A7 | 1.005632385034E−03 | 4.747975972453E−04 | 2.702136515647E−03 | −7.146305848620E−04 |
| A8 | −7.625315890912E−05 | 1.306199805396E−04 | 8.599781756034E−05 | 2.692363046987E−03 |
| A9 | −3.805589013108E−05 | −2.791306805025E−05 | −8.056573893219E−04 | −7.755248703377E−04 |
| A10 | 7.294945444903E−06 | −4.108907042915E−06 | 1.444248867815E−04 | −3.765803645595E−04 |
| A11 | 5.152873699224E−07 | 1.130464202084E−06 | 1.321400281180E−04 | 2.337384073169E−04 |

TABLE 20-continued

Example 5 Aspheric Surface Coefficient

| | Surface Number | | | |
|---|---|---|---|---|
| | 1 | 2 | 17 | 18 |
| A12 | −2.393114748042E−07 | 6.540108376477E−08 | −4.392749162597E−05 | 5.720324826306E−08 |
| A13 | 7.042924846510E−09 | −2.677767023931E−08 | −9.387830928813E−06 | −2.453094129934E−05 |
| A14 | 3.770456654668E−09 | −5.291755492941E−10 | 5.155115401098E−06 | 3.924083095456E−06 |
| A15 | −3.289566219527E−10 | 4.297815218409E−10 | 1.105047347660E−07 | 9.582809658166E−07 |
| A16 | −2.465787614414E−11 | −6.438073413297E−12 | −2.790777014878E−07 | −2.944252263445E−07 |
| A17 | 4.072776810336E−12 | −3.725292201682E−12 | 1.793443197519E−08 | −6.381438042911E−11 |
| A18 | −2.061972556116E−14 | 1.338975362919E−13 | 5.961155113319E−09 | 6.498587498284E−09 |
| A19 | −1.765340195683E−14 | 1.516329136853E−14 | −6.298668159720E−10 | −5.387144068961E−10 |
| A20 | 7.046481384408E−16 | −8.195258156600E−16 | −1.120633144872E−11 | 8.279664835979E−13 |

Figure 6:
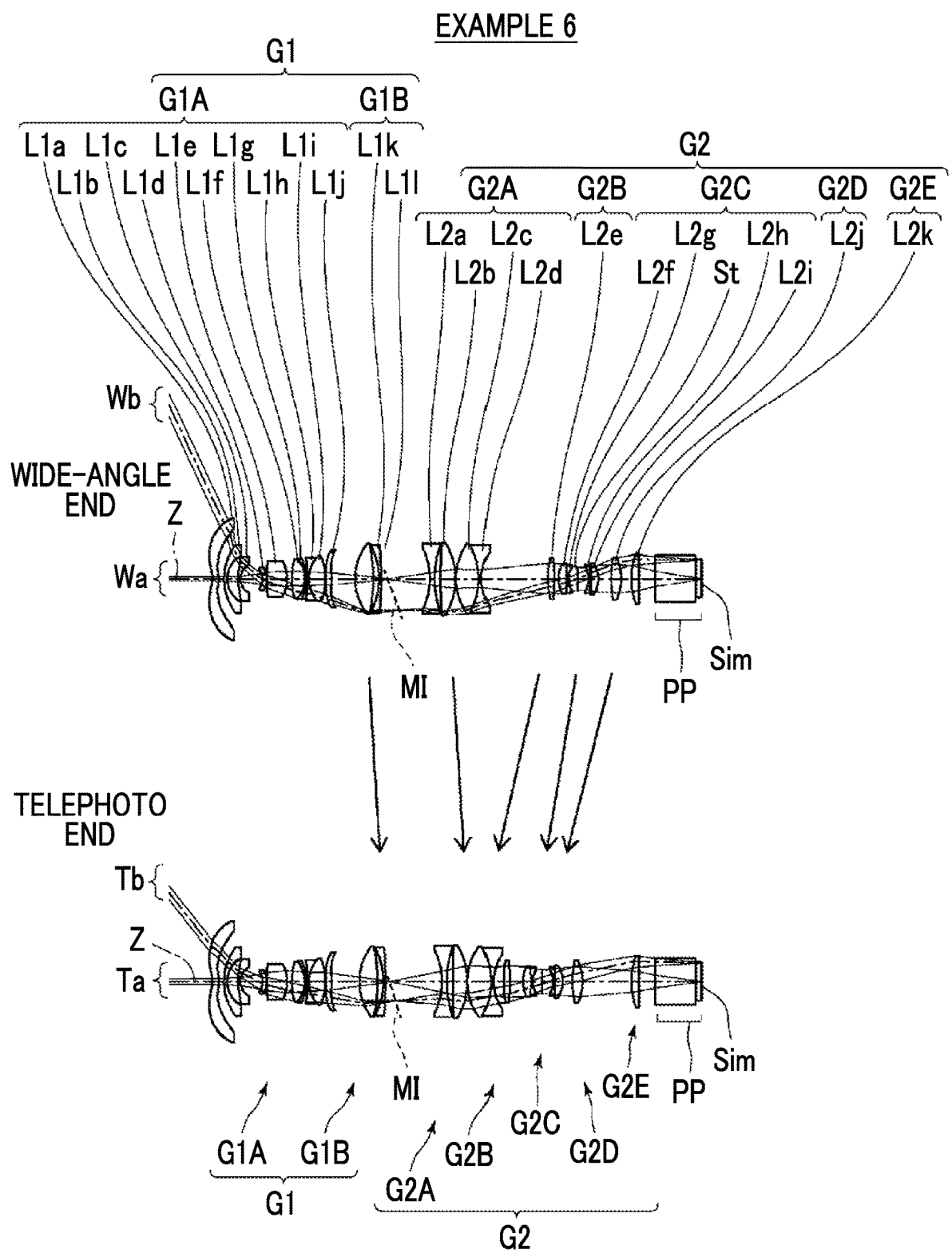
FIG. 6 is a cross-sectional view illustrating a lens configuration of an imaging optical system of Example 6 of the present invention.
Figure 13:
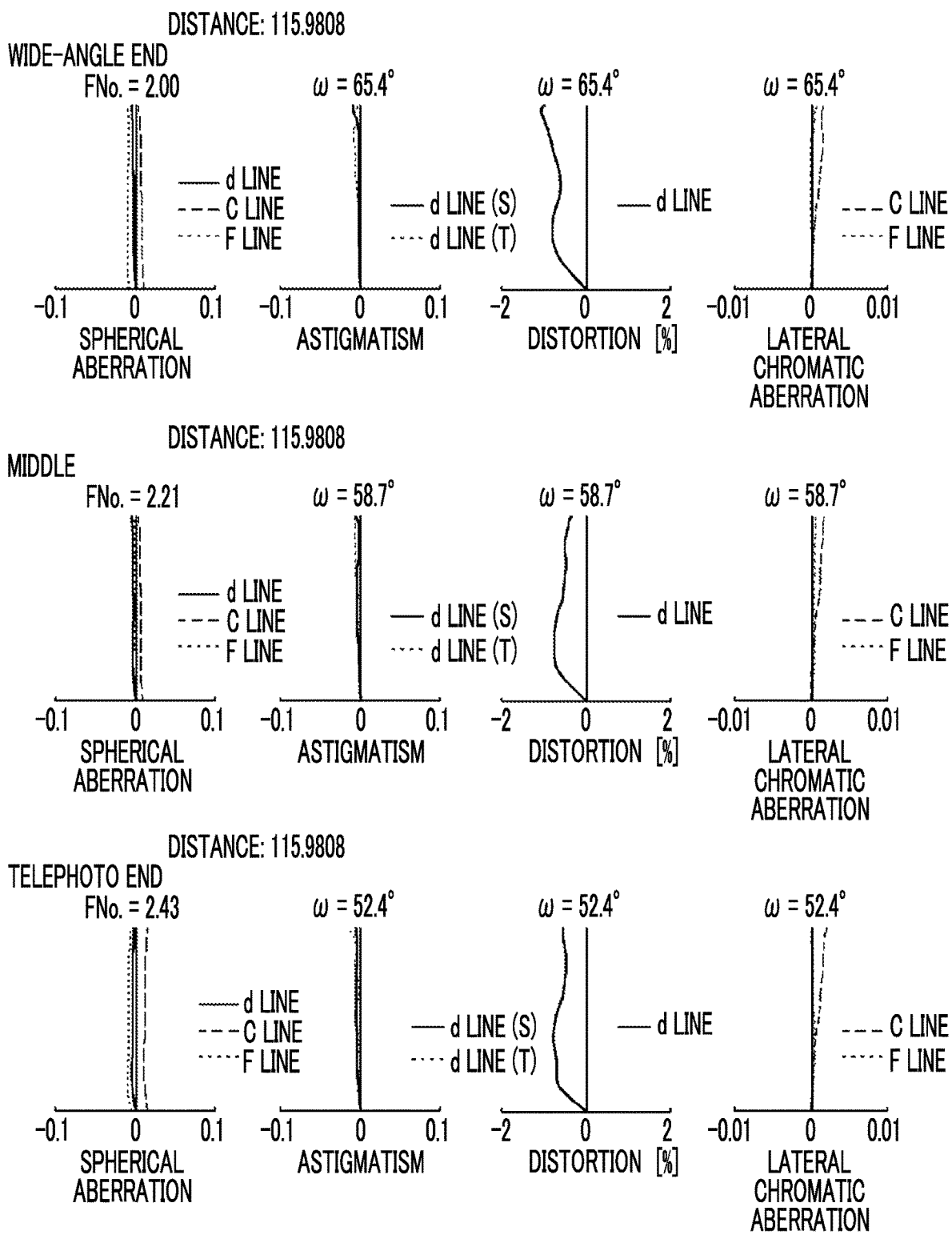
FIG. 13 is a diagram of aberrations of the imaging optical system of Example 6 of the present invention.

Next, an imaging optical system of Example 6 will be described. FIG. 6 is a cross-sectional view illustrating a lens configuration of the imaging optical system of Example 6. The group configuration of the imaging optical system of Example 6 is the same as that of the imaging optical system of Example 5 except the following point. The first imaging optical system G1 is composed of, in order from the magnification side, a first A lens group G1A composed of ten lenses L1a to L1j, and a first B lens group G1B composed of two lenses L1k and L1l. Further, Table 21 shows basic lens data of the imaging optical system of Example 6, Table 22 shows data about specification, Table 23 shows data about variable surface distances, and Table 24 shows data about aspheric surface coefficients. FIG. 13 shows aberration diagrams in a case where the distance from the magnification side imaging surface to the first imaging optical system is set to 115.9808.

TABLE 21

Example 6 Lens Data (n, ν are based on the d line)

| Surface Number | Radius of Curvature | Surface Distance | n | ν |
|---|---|---|---|---|
| *1 | −2.5914 | 0.6798 | 1.53158 | 55.08 |
| *2 | −4.4029 | 0.6308 | | |
| 3.00 | 6.5189 | 0.3778 | 1.51680 | 64.20 |
| 4.00 | 3.1512 | 1.3252 | | |
| 5.0 | 9.9701 | 0.2545 | 1.51680 | 64.20 |
| 6 | 1.9809 | 2.5214 | | |
| 7 | −2.1339 | 0.5196 | 1.72916 | 54.68 |
| 8.00 | −2.5283 | 0.0377 | | |
| 9.00 | 183.7333 | 2.2631 | 1.80809 | 22.76 |
| 10.00 | −4.7626 | 0.5648 | | |
| 11.00 | 8.5038 | 1.4898 | 1.43875 | 94.66 |
| 12.00 | −3.7138 | 0.2073 | 1.84666 | 23.78 |
| 13 | −5.2922 | 0.0377 | | |
| 14 | −29.9071 | 0.2074 | 1.84666 | 23.78 |
| 15 | 3.8526 | 1.9348 | 1.49700 | 81.61 |
| 16 | −6.9413 | 0.0377 | | |
| *17 | −33.2208 | 0.6404 | 1.51007 | 56.24 |
| *18 | −10.0214 | DD[18] | | |
| 19 | 6.8748 | 2.0915 | 1.72916 | 54.68 |
| 20 | −20.9906 | 0.6712 | | |
| 21 | −8.6661 | 0.2262 | 1.62299 | 58.16 |
| 22 | −70.8494 | DD[22] | | |
| 23 | −8.4623 | 0.5657 | 1.51680 | 64.20 |
| 24 | 12.3123 | 0.6298 | | |
| 25 | 50.1231 | 1.7563 | 1.80518 | 25.42 |
| 26 | −8.2571 | 0.0377 | | |
| 27 | 7.1694 | 2.6531 | 1.80610 | 40.93 |
| 28 | −8.5721 | 0.3038 | 1.72825 | 28.46 |
| 29 | 5.7776 | DD[29] | | |
| 30 | 13.3555 | 0.7080 | 1.83481 | 42.72 |
| 31 | −29.1233 | DD[31] | | |
| 32 | 3.9716 | 0.9266 | 1.77250 | 49.60 |
| 33 | −47.2607 | 0.1918 | 1.60342 | 38.03 |
| 34 | 2.6396 | 1.0319 | | |
| 35 (Stop) | ∞ | 1.2827 | | |
| 36 | −3.0313 | 0.1996 | 1.85478 | 24.80 |
| 37 | −97.2714 | 0.0378 | | |
| 38 | 86.2112 | 0.8922 | 1.53775 | 74.70 |
| 39 | −3.4137 | DD[39] | | |
| 40 | 16.7632 | 1.0976 | 1.43875 | 94.66 |
| 41 | −6.6766 | DD[41] | | |
| 42 | 8.6932 | 0.8513 | 1.80809 | 22.76 |
| 43 | −372.1704 | 1.8859 | | |
| 44 | ∞ | 4.7147 | 1.51633 | 64.14 |
| 45 | ∞ | 0.0943 | | |
| 46 | ∞ | 0.5658 | 1.48749 | 70.24 |
| 47 | ∞ | 0.0302 | | |

TABLE 22

Example 6 Specification (d line)

| | Wide-Angle End | Middle | Telephoto End |
|---|---|---|---|
| \|f'\| | 1.00 | 1.33 | 1.70 |
| Bf | 5.49 | | |
| FNo. | 2.00 | 2.21 | 2.43 |
| 2ω [°] | 130.8 | 117.4 | 104.8 |

TABLE 23

Example 6 Variable Surface Distance

| | Wide-Angle End | Middle | Telephoto End |
|---|---|---|---|
| DD[18] | 2.72 | 3.05 | 3.21 |
| DD[22] | 5.62 | 5.89 | 6.51 |
| DD[29] | 7.64 | 4.34 | 1.11 |
| DD[31] | 0.49 | 1.14 | 1.53 |
| DD[39] | 1.51 | 1.34 | 1.18 |
| DD[41] | 1.18 | 3.39 | 5.61 |

TABLE 24

Example 6 Aspheric Surface Coefficient

| | Surface Number | | | |
|---|---|---|---|---|
| | 1 | 2 | 17 | 18 |
| KA | 1.294855140008E−01 | 4.024889814423E−01 | 1.000000000000E+00 | 1.000000000000E+00 |
| A3 | −2.009485982429E−02 | −1.000152399728E−02 | 4.158808237247E−03 | 2.569311585004E−03 |
| A4 | 8.881356849107E−02 | 5.279612206300E−02 | 1.587715217535E−03 | 9.795437793407E−03 |
| A5 | −2.979451104551E−02 | −3.038662066643E−03 | 7.290963204700E−03 | −1.347901767240E−03 |
| A6 | −3.332085100953E−03 | −9.936772523269E−03 | −2.992440479795E−03 | 1.878180632659E−03 |
| A7 | 3.905438212720E−03 | 2.275900340662E−03 | 1.995331155634E−03 | 3.598194719114E−03 |
| A8 | −3.907003169112E−04 | 6.033803705512E−04 | −1.745164724874E−03 | −4.641349475515E−03 |
| A9 | −2.368968228919E−04 | −2.017825774656E−04 | −5.452128577965E−04 | 1.581495645079E−04 |
| A10 | 5.753668024369E−05 | −3.078829447490E−05 | 1.262371369235E−03 | 1.722561564088E−03 |
| A11 | 5.249664839984E−06 | 1.289839561971E−05 | −1.715074348217E−04 | −4.396637129466E−04 |
| A12 | −3.009678215361E−06 | 8.044835142536E−07 | −3.392962103692E−04 | −3.355408991431E−04 |
| A13 | 1.042573653408E−07 | −5.036554762388E−07 | 1.127611918081E−04 | 1.418289800022E−04 |
| A14 | 7.595857334399E−08 | −1.077180177866E−08 | 3.691647700319E−05 | 2.963012781279E−05 |
| A15 | −8.117278133900E−09 | 1.367989434266E−08 | −2.038153271646E−05 | −2.081200081891E−05 |
| A16 | −8.026653339325E−10 | −2.868732683177E−10 | −8.418435514567E−07 | −1.882392566827E−07 |
| A17 | 1.611473189123E−10 | −2.040495214554E−10 | 1.589724877385E−06 | 1.449277446130E−06 |
| A18 | −7.828700724988E−13 | 9.943347391486E−12 | −1.215177589821E−07 | −1.296575443695E−07 |
| A19 | −1.113343565774E−12 | 1.409495462870E−12 | −4.628056028654E−08 | −3.867895755538E−08 |
| A20 | 5.509540547227E−14 | −1.020868101373E−13 | 6.482737283984E−09 | 5.650504857912E−09 |

Figure 7:
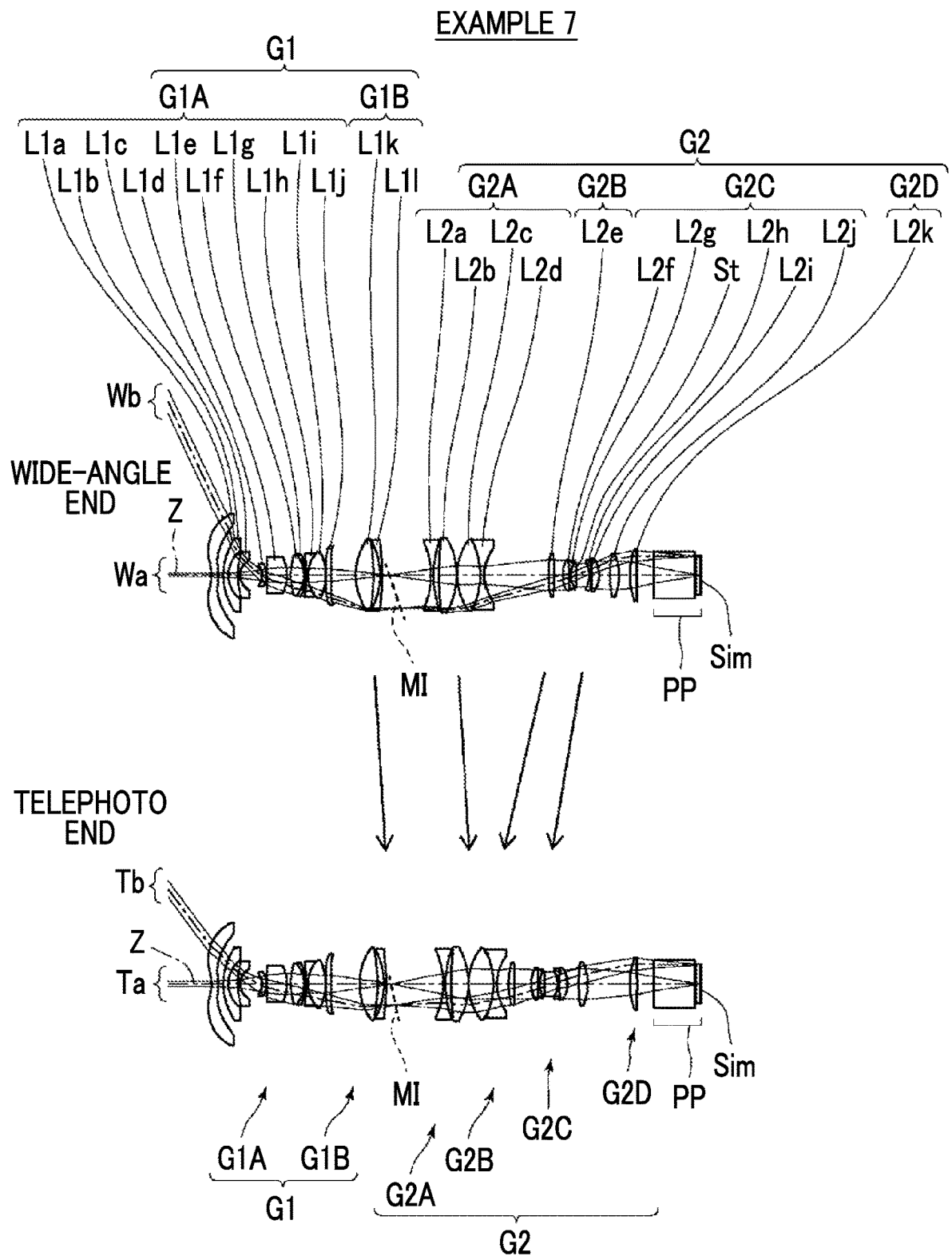
FIG. 7 is a cross-sectional view illustrating a lens configuration of an imaging optical system of Example 7 of the present invention.

Next, an imaging optical system of Example 7 will be described. FIG. 7 is a cross-sectional view illustrating a lens configuration of the imaging optical system of Example 7.

In the imaging optical system of Example 7, the first imaging optical system G1 is composed of, in order from the magnification side, a first A lens group G1A composed of ten lenses L1a to L1j, and a first B lens group GM composed of two lenses L1k and L1l. The second imaging optical system G2 is composed of, in order from the magnification side, a second A lens group G2A composed of four lenses L2a to L2d, a second B lens group G2B composed of only one lens L2e, a second C lens group G2C composed of five lenses L2f to L2j and an aperture stop St, and a second D lens group G2D composed of only one lens L2k. In the imaging optical system of Example 7, the second A lens group G2A corresponds to the magnification side moving group, and the second B lens group G2B and the second C lens group G2C correspond to the reduction side moving group.

Figure 14:
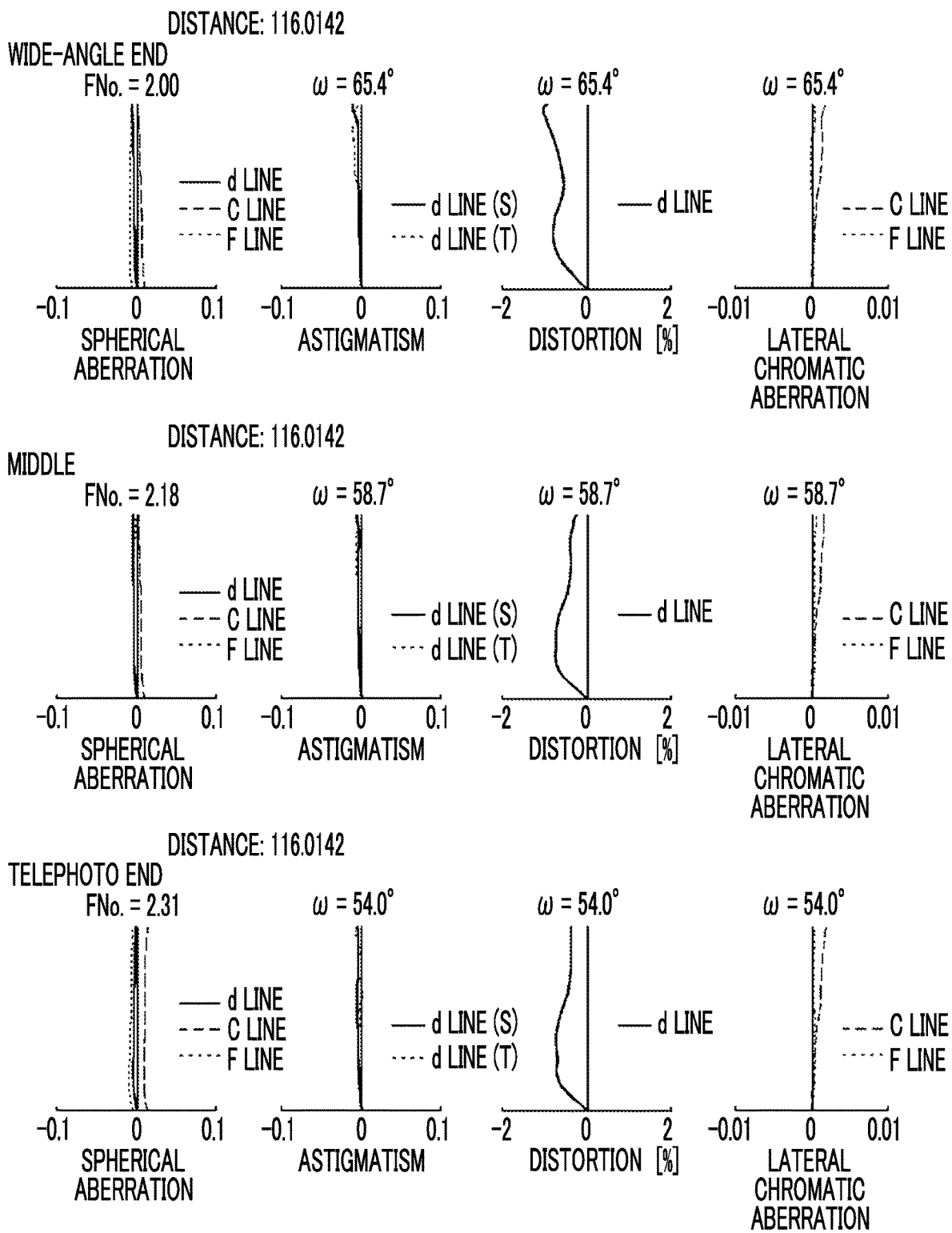
FIG. 14 is a diagram of aberrations of the imaging optical system of Example 7 of the present invention.

Further, Table 25 shows basic lens data of the imaging optical system of Example 7, Table 26 shows data about specification, Table 27 shows data about variable surface distances, and Table 28 shows data about aspheric surface coefficients. FIG. 14 shows aberration diagrams in a case where the distance from the magnification side imaging surface to the first imaging optical system is set to 116.0142.

TABLE 25

Example 7 Lens Data (n, ν are based on the d line)

| Surface Number | Radius of Curvature | Surface Distance | n | ν |
|---|---|---|---|---|
| *1 | −2.6587 | 0.7462 | 1.53158 | 55.08 |
| *2 | −4.7136 | 0.5659 | | |
| 3 | 7.4194 | 0.5499 | 1.51680 | 64.20 |
| 4 | 3.3194 | 1.1485 | | |
| 5 | 9.3948 | 0.2546 | 1.51680 | 64.20 |
| 6 | 1.9682 | 2.4689 | | |
| 7 | −2.0853 | 0.5206 | 1.72916 | 54.68 |
| 8 | −2.4975 | 0.0377 | | |
| 9 | 176.4636 | 2.2635 | 1.80809 | 22.76 |
| 10 | −4.6868 | 0.4548 | | |
| 11 | 8.4248 | 1.4679 | 1.43875 | 94.66 |
| 12 | −3.7853 | 0.2074 | 1.84666 | 23.78 |

TABLE 25-continued

Example 7 Lens Data (n, ν are based on the d line)

| Surface Number | Radius of Curvature | Surface Distance | n | ν |
|---|---|---|---|---|
| 13 | −5.4932 | 0.0376 | | |
| 14 | −29.6049 | 0.2075 | 1.84666 | 23.78 |
| 15 | 3.8537 | 1.9954 | 1.49700 | 81.61 |
| 16 | −6.4804 | 0.0377 | | |
| *17 | −22.4475 | 0.6364 | 1.51007 | 56.24 |
| *18 | −8.8977 | DD[18] | | |
| 19 | 7.1981 | 2.0199 | 1.72916 | 54.68 |
| 20 | −22.1354 | 0.7308 | | |
| 21 | −8.4758 | 0.2263 | 1.62299 | 58.16 |
| 22 | −34.1752 | DD[22] | | |
| 23 | −9.5394 | 0.2830 | 1.51680 | 64.20 |
| 24 | 11.5832 | 0.6550 | | |
| 25 | 50.4780 | 1.9884 | 1.80518 | 25.42 |
| 26 | −8.4979 | 0.0378 | | |
| 27 | 6.8345 | 2.6801 | 1.80610 | 40.93 |
| 28 | −8.9039 | 0.4124 | 1.72825 | 28.46 |
| 29 | 5.3956 | DD[29] | | |
| 30 | 12.0487 | 0.6586 | 1.83481 | 42.72 |
| 31 | −28.1445 | DD[31] | | |
| 32 | 3.9676 | 0.7343 | 1.77250 | 49.60 |
| 33 | 52.2513 | 0.1903 | 1.60342 | 38.03 |
| 34 | 2.6537 | 0.5988 | | |
| 35 (Stop) | ∞ | 1.4811 | | |
| 36 | −3.0264 | 0.1886 | 1.85478 | 24.80 |
| 37 | −83.2438 | 0.0378 | | |
| 38 | 87.6460 | 0.8872 | 1.53775 | 74.70 |
| 39 | −3.3621 | 1.2437 | | |
| 40 | 16.5131 | 1.0194 | 1.43875 | 94.66 |
| 41 | −6.2547 | DD[41] | | |
| 42 | 8.9898 | 0.8252 | 1.80809 | 22.76 |
| 43 | −166.2262 | 1.8864 | | |
| 44 | ∞ | 4.7160 | 1.51633 | 64.14 |
| 45 | ∞ | 0.0943 | | |
| 46 | ∞ | 0.5659 | 1.48749 | 70.24 |
| 47 | ∞ | 0.0280 | | |

TABLE 26

Example 7 Specification (d line)

| | Wide-Angle End | Middle | Telephoto End |
|---|---|---|---|
| \|f'\| | 1.00 | 1.33 | 1.60 |
| Bf | 5.49 | | |
| FNo. | 2.00 | 2.18 | 2.31 |
| 2ω [°] | 130.8 | 117.4 | 108.0 |

TABLE 27

Example 7 Variable Surface Distance

| | Wide-Angle End | Middle | Telephoto End |
|---|---|---|---|
| DD[18] | 2.73 | 3.07 | 3.17 |
| DD[22] | 5.53 | 5.93 | 6.46 |
| DD[29] | 7.21 | 3.84 | 1.35 |
| DD[31] | 0.95 | 1.54 | 1.86 |
| DD[41] | 1.21 | 3.25 | 4.78 |

TABLE 28

Example 7 Aspheric Surface Coefficient

| | Surface Number | | | |
|---|---|---|---|---|
| | 1 | 2 | 17 | 18 |
| KA | 1.377491397429E−01 | 4.542301867767E−01 | 1.000000000000E+00 | 1.000000000000E+00 |
| A3 | −2.124410000509E−02 | −1.131911451977E−02 | 4.865449845030E−03 | 3.048546422776E−03 |
| A4 | 8.764219871997E−02 | 5.232391445587E−02 | −1.789268494798E−03 | 7.577862270575E−03 |
| A5 | −2.961819339080E−02 | −3.394137518277E−03 | 8.770735093505E−03 | −2.336402318057E−03 |
| A6 | −3.162518999210E−03 | −9.847450744338E−03 | −4.518130786907E−03 | 3.298375264222E−03 |
| A7 | 3.889121053843E−03 | 2.398248157358E−03 | 2.953875441579E−03 | 3.028324553440E−03 |
| A8 | −4.100149445724E−04 | 5.608678557310E−04 | −1.463979339708E−03 | −5.018921954912E−03 |
| A9 | −2.356125841238E−04 | −2.082604470428E−04 | −1.373699993943E−05 | 5.135977479058E−04 |
| A10 | 5.931901072922E−05 | −2.651170150092E−05 | 1.596739732286E−03 | 1.751173796111E−03 |
| A11 | 5.062111469547E−06 | 1.286670079869E−05 | −1.249106295801E−05 | −5.432702545374E−04 |
| A12 | −3.104882722377E−06 | 5.746901665485E−07 | −4.924127713612E−04 | −3.208259897434E−04 |
| A13 | 1.194071892928E−07 | −4.792073465961E−07 | 1.232157189095E−04 | 1.573663159033E−04 |
| A14 | 7.848426453737E−08 | −5.243381607092E−09 | 6.069362516088E−05 | 2.539930047512E−05 |
| A15 | −8.708704494185E−09 | 1.261389736187E−08 | −2.679620837074E−05 | −2.194164172319E−05 |
| A16 | −8.242371039062E−10 | −3.353342052583E−10 | −2.136206996726E−06 | 2.553746358019E−07 |
| A17 | 1.721842289987E−10 | −1.828152656482E−10 | 2.289940000656E−06 | 1.480944987261E−06 |
| A18 | −1.069754328649E−12 | 9.301290007919E−12 | −1.424848015339E−07 | −1.496379132831E−07 |
| A19 | −1.192856240471E−12 | 1.262525129507E−12 | −7.114255618001E−08 | −3.871518264486E−08 |
| A20 | 5.996030066454E−14 | −9.242071577295E−14 | 9.541825607264E−09 | 5.957421151799E−09 |

Table 29 shows values corresponding to Conditional Expressions (1) to (5) of the imaging optical systems of Examples 1 to 7. It should be noted that, in the above-mentioned examples, the d line is set as the reference wavelength, and the values shown in Table 29 are values at the reference wavelength.

TABLE 29

| Expression Number | Conditional Expression | Example 1 | Example 2 | Example 3 | Example 4 |
|---|---|---|---|---|---|
| (1) | (\|f1w\|/\|fw\| − f1t/\|ft\|) × Ymax/\|fw\| | 2.45 | 2.45 | 2.80 | 2.44 |
| (2) | βBt/βBw | 1.77 | 1.76 | 2.14 | 1.95 |
| (3) | βAt/βAw | 1.01 | 1.01 | 1.02 | 1.02 |
| (4) | fBL/\|fw\| | 15.21 | 15.30 | 15.30 | 15.13 |
| (5) | Bfw/\|fw\| | 12.44 | 12.47 | 13.53 | 12.78 |

TABLE 29-continued

| Expression Number | Conditional Expression | Example 6 | Example 7 | Example 8 |
|---|---|---|---|---|
| (1) | (\|f1w\|/\|fw\| − f1t/\|ft\|) × Ymax/\|fw\| | 1.91 | 1.47 | 1.35 |
| (2) | βBt/βBw | 1.56 | 1.49 | 1.41 |
| (3) | βAt/βAw | 1.08 | 1.10 | 1.10 |
| (4) | fBL/\|fw\| | 14.51 | 11.04 | 25.39 |
| (5) | Bfw/\|fw\| | 11.26 | 10.52 | 10.58 |

As can be seen from the above data, since all the imaging optical systems of Examples 1 to 7 satisfy Conditional Expressions (1) to (5), each imaging optical system has a high optical performance, in which various aberrations are satisfactorily corrected, while having a wide angle and a high magnification. The wide angle means that the total angle of view is equal to or greater than 125°. The high magnification means that the zoom ratio is equal to or greater than 1.5 times.

Figure 15:
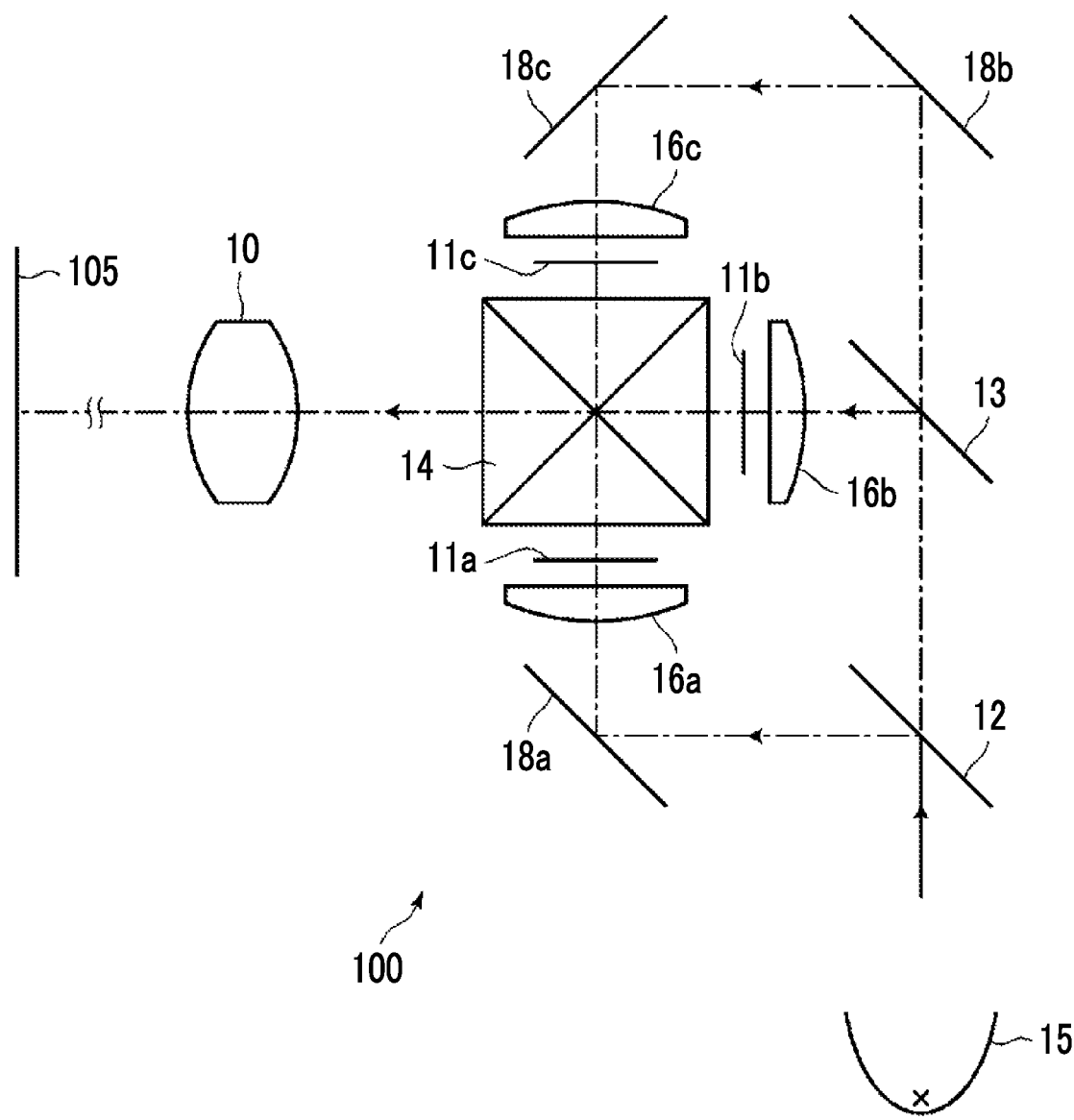
FIG. 15 is a schematic configuration diagram of a projection display device according to an embodiment of the present invention.

Next, a projection display device according to an embodiment of the present invention will be described. FIG. 15 is a schematic configuration diagram of the projection display device according to the above-mentioned embodiment of the present invention. The projection display device 100 shown in FIG. 15 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 15, the imaging optical system 10 is schematically illustrated. Further, an integrator is disposed between the light source 15 and the dichroic mirror 12, but illustration thereof is omitted in FIG. 15.

White light originated from the light source 15 is separated into rays with three colors (G light, B light, R light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light modulated through the transmissive display elements 11a to 11c, onto a screen 105.

Figure 16:
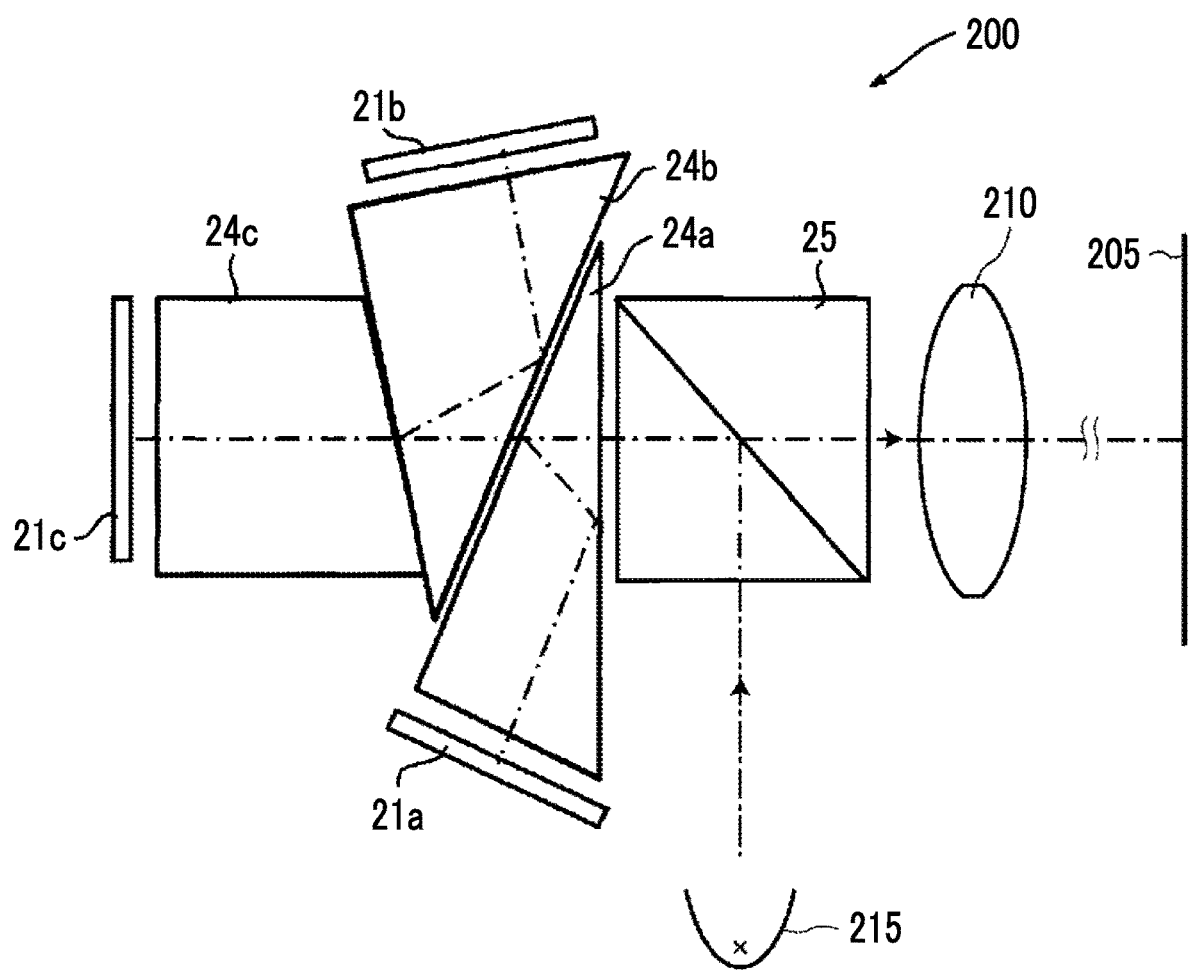
FIG. 16 is a schematic configuration diagram of a projection display device according to another embodiment of the present invention.

FIG. 16 is a schematic configuration diagram of a projection display device according to another embodiment of the present invention. The projection display device 200 shown in FIG. 16 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 16, the imaging optical system 210 is schematically illustrated. Further, an integrator is disposed between the light source 215 and the polarization separating prism 25, but illustration thereof is omitted in FIG. 16.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light modulated through the DMD elements 21a to 21c, onto a screen 205.

Figure 17:
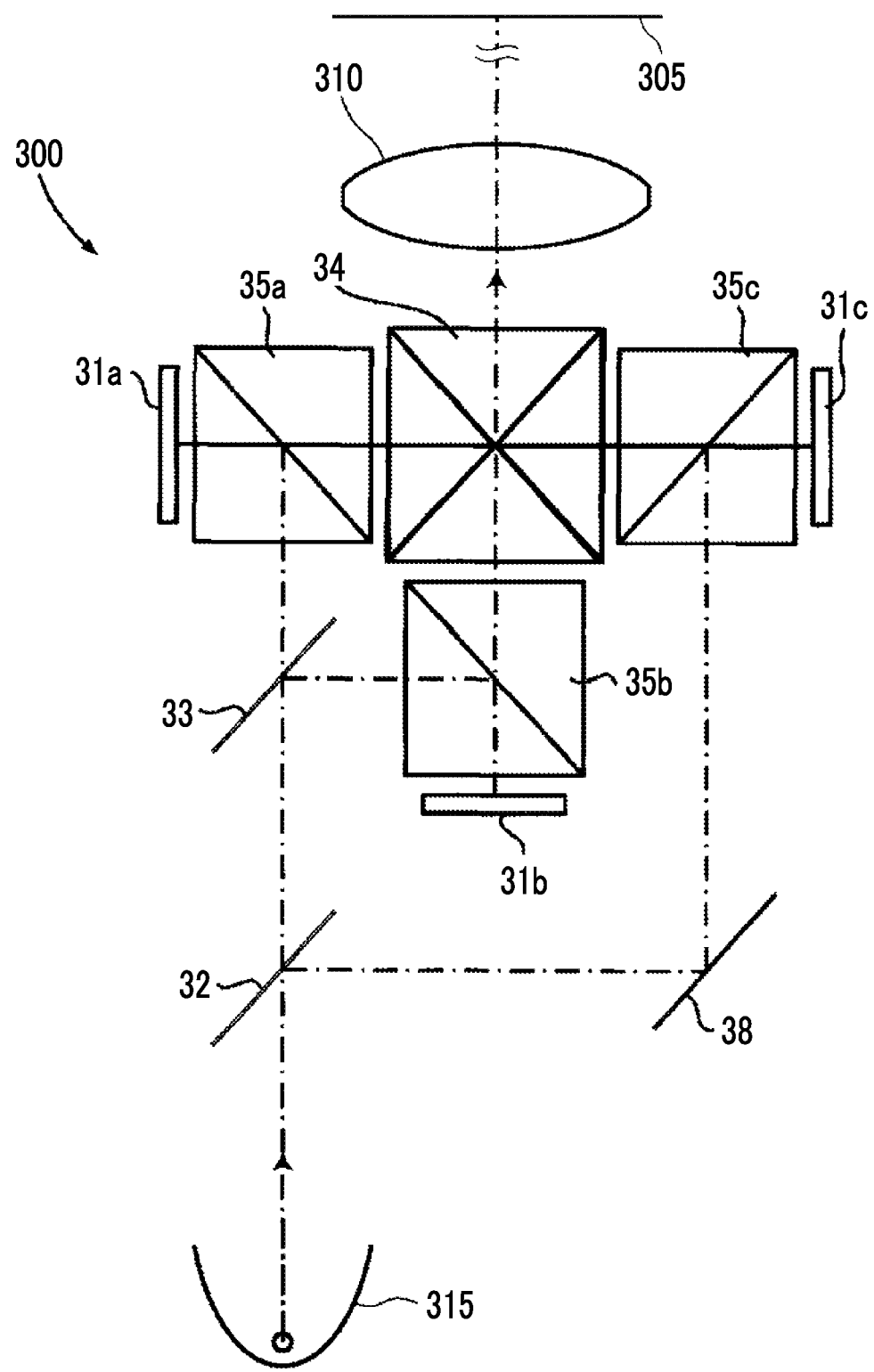
FIG. 17 is a schematic configuration diagram of a projection display device according to still another embodiment of the present invention.

FIG. 17 is a schematic configuration diagram of a projection display device according to still another embodiment of the present invention. The projection display device 300 shown in FIG. 17 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 17, the imaging optical system 310 is schematically illustrated. Further, an integrator is disposed between the light source 315 and the dichroic mirror 32, but illustration thereof is omitted in FIG. 17.

White light originated from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light modulated through the reflective display elements 31a to 31c, onto a screen 305.

Figure 18:
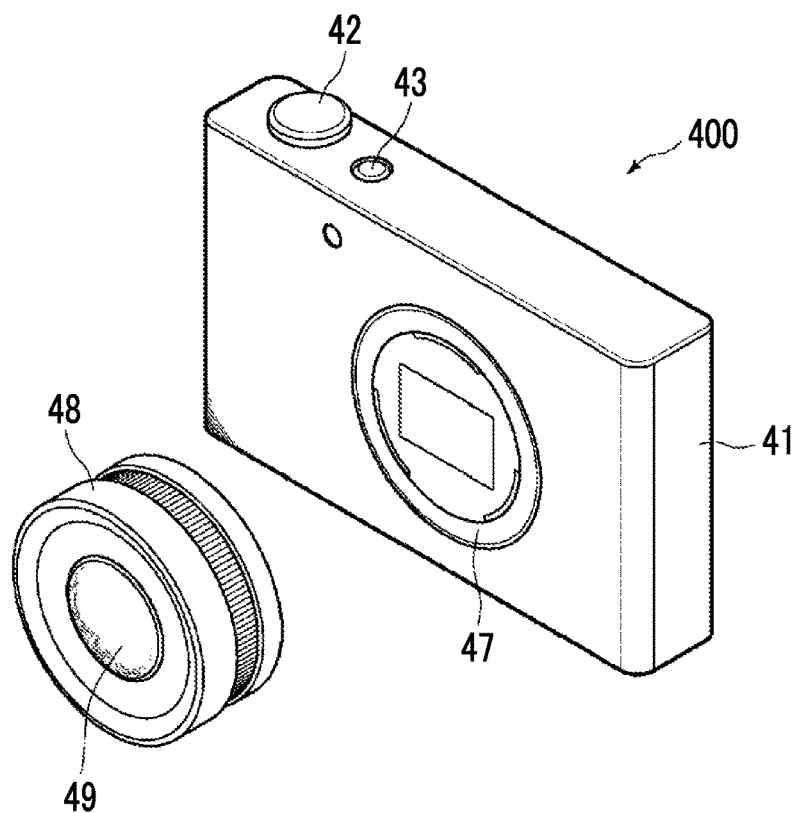
FIG. 18 is a perspective view of the front side of an imaging apparatus according to an embodiment of the present invention.
Figure 19:
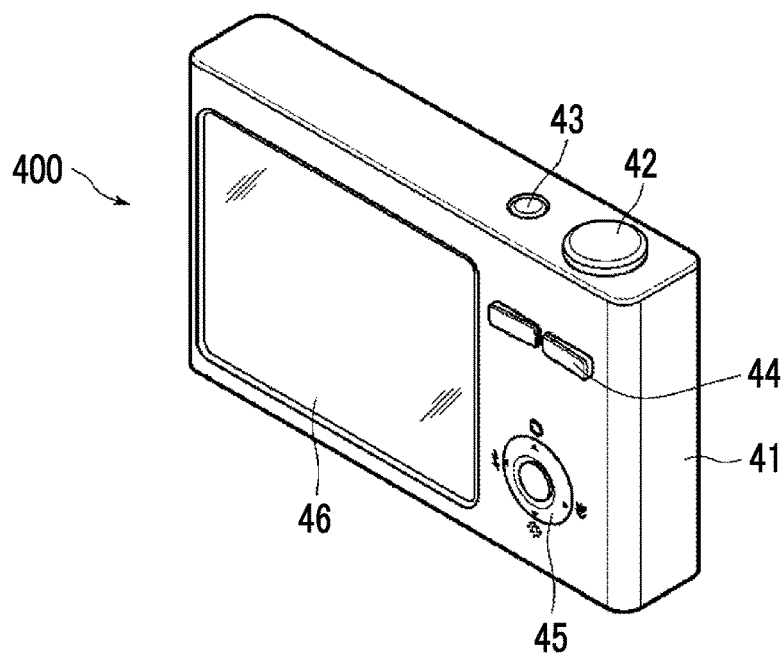
FIG. 19 is a perspective view of the rear side of the imaging apparatus shown in FIG. 18.

FIGS. 18 and 19 are external views of a camera 400 which is the imaging apparatus according to the above-mentioned embodiment of the present invention. FIG. 18 is a perspective view of the camera 400 viewed from the front side, and FIG. 19 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system according to the embodiment of the present invention is not limited to the above-mentioned embodiments and examples, and may be modified into various forms. For example, the radius of curvature, the surface distance, the refractive index, and the Abbe number of each lens may be appropriately changed.

Further, the projection display device according to the embodiment of the present invention is not limited to that of the above-mentioned configuration. For example, the used light valve and the optical member used in separation or synthesis of rays are not limited to those of the above-mentioned configuration, and may be modified into various forms. The light valve is not limited to an aspect in which light from a light source is spatially modulated by image display elements, and is output as an optical image based on image data, and may have an aspect in which light that is output by self-luminous image display elements is output as an optical image based on image data. Examples of self-luminous image display elements include image display elements in which light emitting elements such as light emitting diodes (LEDs) or organic light emitting diodes (OLEDs) are arrayed two-dimensionally.

Further, the imaging apparatus according to the embodiment of the present invention is also not limited to the above-mentioned configurations. For example, the present invention may be applied to a single-lens reflex camera, a film camera, a video camera, and the like.

EXPLANATION OF REFERENCES

10, 210, 310: imaging optical system
11a to 11c: transmissive display element
12, 13, 32, 33: dichroic mirror 14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
G1: first imaging optical system
G1A: first A lens group
G1B: first B lens group
G2: second imaging optical system
G2A: second A lens group
G2B: second B lens group
G2C: second C lens group
G2D: second D lens group
G2E: second E lens group
G2F: second F lens group
L1a to L2m: lens
MI: intermediate image
PP: optical member
R1: first optical path deflection unit
R2: second optical path deflection unit
Sim: image display surface
Ta: on-axis rays at telephoto end
Tb: rays with the maximum angle of view at telephoto end
Wa: on-axis rays at wide-angle end
Wb: rays with the maximum angle of view at wide-angle end
Z: optical axis

What is claimed is:

1. An imaging optical system consisting of, in order from a magnification side:
   a first imaging optical system that forms an intermediate image on a position conjugate to a magnification side imaging surface; and
   a second imaging optical system that re-forms the intermediate image on a reduction side imaging surface,
   wherein in a case where a group from which an adjacent group is separated by a distance variable in a direction of an optical axis during zooming is set as one lens group, the second imaging optical system consists of a plurality of lens groups including at least two movable lens groups which move during zooming,
   wherein
      a focal length of the first imaging optical system at a wide-angle end is f1w,
      a focal length of the whole system at the wide-angle end is fw,
      a focal length of the first imaging optical system at a telephoto end is f1t,
      a focal length of the whole system at the telephoto end is ft, and
      an effective image circle radius on a reduction side is Ymax,
   Conditional Expression (1) is satisfied;

$$1.15 < (f1w/|fw| - f1t/|ft|) \times Ymax/|fw| < 5 \qquad (1).$$

2. The imaging optical system according to claim 1, comprising six or seven lens groups as a whole,
   wherein a lens group closest to the magnification side and a lens group closest to the reduction side are lens groups that have positive refractive powers and remain stationary with respect to the reduction side imaging surface during zooming.

3. The imaging optical system according to claim 1,
   wherein in a case where the movable lens groups disposed on the magnification side with a maximum air distance at the wide-angle end are collectively set as a magnification side moving group and the movable lens groups disposed on the reduction side are collectively set as a reduction side moving group in the second imaging optical system, during zooming from the wide-angle end to the telephoto end, the movable lens groups in the magnification side moving group move toward the reduction side, and the movable lens groups in the reduction side moving group move to the magnification side.

4. The imaging optical system according to claim 3,
   wherein
      a lateral magnification of the reduction side moving group at the telephoto end is βBt, and
      a lateral magnification of the reduction side moving group at the wide-angle end is βBw,
   Conditional Expression (2) is satisfied;

$$1.3 < \beta Bt/\beta Bw < 3 \qquad (2).$$

5. The imaging optical system according to claim 4, wherein Conditional Expression (2-1) is satisfied;

$$1.35 < \beta Bt/\beta Bw < 2.5 \qquad (2\text{-}1).$$

6. The imaging optical system according to claim 3,
   wherein
      a lateral magnification of the magnification side moving group at the telephoto end is βAt, and
      a lateral magnification of the magnification side moving group at the wide-angle end is βAw,
   Conditional Expression (3) is satisfied;

$$0.8 < \beta At/\beta Aw < 1.2 \qquad (3).$$

7. The imaging optical system according to claim 6, wherein Conditional Expression (3-1) is satisfied;

$$0.85 < \beta At/\beta Aw < 1.15 \qquad (3\text{-}1).$$

8. The imaging optical system according to claim 3,
   wherein the reduction side moving group has the at least two movable lens groups, and
   wherein a focal length of the movable lens group closest to the reduction side in the reduction side moving group is fBL, Conditional Expression (4) is satisfied;

$$8 < fBL/|fw| < 40 \qquad (4).$$

9. The imaging optical system according to claim 8, wherein Conditional Expression (4-1) is satisfied;

$$10.5 < fBL/|fw| < 35 \qquad (4\text{-}1).$$

10. The imaging optical system according to claim 1,
   wherein a back focal length of the whole system at the wide-angle end is Bfw, Conditional Expression (5) is satisfied;

$$7 < Bfw/|fw| \qquad (5).$$

11. The imaging optical system according to claim 10, wherein Conditional Expression (5-1) is satisfied;

$$9 < Bfw/|fw| < 20 \tag{5-1}.$$

12. The imaging optical system according to claim 1, wherein a lens group closest to the reduction side in the whole system consists of one single lens.

13. The imaging optical system according to claim 1, wherein the second imaging optical system consists of, in order from the magnification side, a second A lens group having a positive refractive power, a second B lens group having a positive refractive power, a second C lens group having a positive refractive power, a second D lens group having a negative refractive power, a second E lens group having a positive refractive power, and a second F lens group having a positive refractive power, and wherein during zooming, the second B lens group, the second C lens group, the second D lens group, and the second E lens group move, and the second F lens group remains stationary with respect to the reduction side imaging surface.

14. The imaging optical system according to claim 1, wherein the second imaging optical system consists of, in order from the magnification side, a second A lens group having a positive refractive power, a second B lens group having a positive refractive power, a second C lens group having a negative refractive power, a second D lens group having a positive refractive power, and a second E lens group having a positive refractive power, and wherein during zooming, the second A lens group, the second B lens group, the second C lens group, and the second D lens group move, and the second E lens group remains stationary with respect to the reduction side imaging surface.

15. The imaging optical system according to claim 1, wherein the second imaging optical system consists of, in order from the magnification side, a second A lens group having a positive refractive power, a second B lens group having a positive refractive power, a second C lens group having a positive refractive power, and a second D lens group having a positive refractive power, and wherein during zooming, the second A lens group, the second B lens group, and the second C lens group move, and the second D lens group remains stationary with respect to the reduction side imaging surface.

16. The imaging optical system according to claim 1, wherein Conditional Expression (1-1) is satisfied;

$$1.2 < (f1w/|fw| - f1t/|ft|) \times Y\max/|fw| < 3.5 \tag{1-1}.$$

17. A projection display device, comprising:
a light valve from which an optical image is output based on image data; and
the imaging optical system according to claim 1,
wherein the imaging optical system projects the optical image, which is output from the light valve, onto a screen.

18. An imaging apparatus comprising the imaging optical system according to claim 1.

* * * * *